(12) United States Patent
Misaki

(10) Patent No.: US 9,576,696 B2
(45) Date of Patent: Feb. 21, 2017

(54) ELECTRODE SUBSTRATE INCLUDING LEAD INTERCONNECT CONNECTED TO TRANSPARENT ELECTRODE, AND DISPLAY DEVICE AND TOUCH PANEL HAVING THE SAME

(75) Inventor: Katsunori Misaki, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 442 days.

(21) Appl. No.: 13/984,940

(22) PCT Filed: Feb. 21, 2012

(86) PCT No.: PCT/JP2012/001155
§ 371 (c)(1),
(2), (4) Date: Aug. 12, 2013

(87) PCT Pub. No.: WO2012/117692
PCT Pub. Date: Sep. 7, 2012

(65) Prior Publication Data
US 2013/0314626 A1    Nov. 28, 2013

(30) Foreign Application Priority Data

Feb. 28, 2011    (JP) .................................. 2011-042383

(51) Int. Cl.
*H01B 1/16*    (2006.01)
*G06F 3/044*    (2006.01)
(Continued)

(52) U.S. Cl.
CPC ............. *H01B 1/16* (2013.01); *G02F 1/13338* (2013.01); *G02F 1/13439* (2013.01); *G06F 3/044* (2013.01)

(58) Field of Classification Search
CPC combination set(s) only.
See application file for complete search history.

(56) References Cited

U.S. PATENT DOCUMENTS

2002/0179972 A1* 12/2002 Yamazaki ......... H01L 23/53214
257/368
2006/0023138 A1    2/2006 Choi et al.
(Continued)

FOREIGN PATENT DOCUMENTS

| JP | 2002-222954 A | 8/2002 |
| JP | 2004-139054 A | 5/2004 |
| JP | 2006-047985 A | 2/2006 |

OTHER PUBLICATIONS

Official Communication issued in International Patent Application No. PCT/JP2012/001155, mailed on May 29, 2012.

*Primary Examiner* — Lauren Nguyen
(74) *Attorney, Agent, or Firm* — Keating & Bennett, LLP

(57) ABSTRACT

A drive substrate, including: an insulating substrate (10); an internal connection terminal (12b) made of ITO or IZO provided on the substrate (10); and a lead interconnect (14) that is connected to the connection terminal (12b) with one end thereof lying on the connection terminal and is led out to an outer edge of the insulating substrate (10) at the other end thereof, wherein a contact portion of the lead interconnect (14) with the internal connection terminal (12b) is formed of a barrier metal layer (15A) made of titanium nitride (TiN) and the nitride concentration thereof is between 35 atoms/cm$^2$ and 65 atoms/cm$^2$ inclusive.

5 Claims, 15 Drawing Sheets

(51) Int. Cl.
*G02F 1/1333* (2006.01)
*G02F 1/1343* (2006.01)

(56) References Cited

U.S. PATENT DOCUMENTS

| | | |
|---|---|---|
| 2006/0164578 A1 | 7/2006 | Matsumoto et al. |
| 2010/0182275 A1* | 7/2010 | Saitou ..................... G06F 3/044 |
| | | 345/174 |
| 2010/0220092 A1* | 9/2010 | Kimura ................ G09G 3/3233 |
| | | 345/213 |

* cited by examiner

ELECTRODE SUBSTRATE INCLUDING LEAD INTERCONNECT CONNECTED TO TRANSPARENT ELECTRODE, AND DISPLAY DEVICE AND TOUCH PANEL HAVING THE SAME

TECHNICAL FIELD

The present disclosure relates to an electrode substrate, and a display device and touch panel having the same, and more particularly to measures to prevent peeling off of interconnects.

BACKGROUND ART

In recent years, developed have been liquid crystal display devices that perform three-dimensional (3D) display by letting the right and left eyes of an observer visually recognize images viewed from different points of view thereby giving parallax, and some of such devices have been commercialized.

Among such liquid crystal display devices, there is one where a parallax barrier having light-transmitting regions and light-shielding regions formed alternately in a striped shape is combined with a liquid crystal display panel. With this parallax barrier, specific viewing angles are respectively given to a right-eye image and a left-eye image displayed by the liquid crystal display panel, whereby images corresponding to the right eye and the left eye are made visually recognizable if only viewed in a specific observation range in the space. Thus, an observer can recognize 3D display without the necessity of using a visual aid such as a filter system.

Moreover, there is known a 2D/3D switchable liquid crystal display device where a means for enabling or disabling the parallax barrier function is realized by a switching liquid crystal panel to permit switching between 3D display and two-dimensional (2D) display (see Patent Document 1, for example).

The switching liquid crystal panel is constituted by a pair of substrates bonded together with a frame-shaped sealing material and a liquid crystal layer sealed inside the frame of the sealing material. On the inner surfaces of the substrates constituting the switching liquid crystal panel facing each other, switch electrodes for switching of the parallax barrier function are provided in a parallax barrier region corresponding to a display region. A lead interconnect is connected to each switch electrode with one end thereof lying on the switch electrode. The lead interconnect extends through a frame region outside the parallax barrier region to be led up to a substrate edge. The lead tip end constitutes an external connection terminal, via which the lead interconnect is connected to an external circuit.

Recently, also, for display devices such as liquid crystal display devices, a touch panel has been widely used, which is placed on a display panel to serve as an input device for inputting information into the display device by performing various types of operations on the display screen using a finger, a pen, etc.

Such touch panels are classified, according to the operating principle, into ones of a resistive film method, a capacitive method, an infrared method, an ultrasonic method, an electromagnetic induction method, etc. Among others, a capacitive touch panel is known suitable for display devices because it comparatively less impairs the optical characteristics of display devices.

A capacitive touch panel has touch detection electrodes for touch position detection in a touch region corresponding to the display region. A lead interconnect is connected to each touch detection electrode with one end thereof lying on the touch detection electrode. The lead interconnect extends through a frame region outside the touch region to be led up to a substrate edge. The lead tip end constitutes an external connection terminal, via which the lead interconnect is connected to an external circuit.

In the switching liquid crystal panel and touch panel described above, the regions (parallax bather region and touch region) corresponding to the display region must be transparent to make the display image visually recognizable. Therefore, the switch electrodes and touch detection electrodes located in such regions are formed of a transparent conductive oxide such as indium tin oxide (ITO). On the other hand, the lead interconnects located in the region corresponding to the non-display region do not have to be transparent because they do not block the display image. As the material thereof, therefore, a high-melting metal such as titanium (Ti) and molybdenum (Mo) is suitably used for prevention of electrolytic corrosion reaction at the connection with the switch electrodes and touch detection electrodes made of a transparent conductive oxide (see Patent Documents 2 and 3, for example).

CITATION LIST

Patent Document

PATENT DOCUMENT 1: Japanese Patent Publication No. P2004-139054
PATENT DOCUMENT 2: Japanese Patent Publication No. P2002-222954 (para. 0020)
PATENT DOCUMENT 3: Japanese Patent Publication No. P2006-47985 (paras. 0117-0119)

SUMMARY OF THE DISCLOSURE

Technical Problem

In electrode substrates constituting the switching liquid crystal panel and the touch panel, however, when the switch electrodes and the touch detection electrodes are formed of a transparent conductive oxide to serve as transparent electrodes and the lead interconnects are formed of a high-melting metal as described above, there occurs a problem that the lead interconnects tend to peel off from the transparent electrodes.

The present inventors have earnestly pursued their studies on such electrode substrates, and found that the above problem is caused by a mutual oxidation-reduction reaction between the transparent conductive oxide forming the transparent electrodes and the high-melting metal forming the lead interconnects and the membrane stress remaining in lead interconnect portions on the transparent electrodes.

That is, when a lead interconnect made of titanium (Ti) is connected to a transparent electrode made of ITO with part thereof lying on the transparent electrode, an oxidation-reduction reaction occurs between the transparent electrode and the lead interconnect, causing reduction in the adhesiveness between the transparent electrode and the lead interconnect. Also, while the crystal structure of ITO forming the transparent electrode is of a bixbyite type that is a cubic system, the crystal structure of titanium (Ti) forming the lead interconnect is of a closest packed type that is a hexagonal system. Caused by this difference in crystal system, therefore, an excessive membrane stress remains in the lead interconnect portion on the transparent electrode due to expansion and contraction at the time of formation of the interconnect. These two factors conspire to cause the lead interconnect to easily peel off from the transparent electrode.

Once the lead interconnects peel off from the transparent electrodes, there will be no conduction between the transparent electrodes and the lead interconnects, failing to normally operate the electrode substrate. This will cause occurrence of a defective product including the electrode substrate, resulting in reduction in yield and increase in fabrication cost.

To address the above-described problem, it is an objective of the present disclosure to prevent peeling off of the lead interconnects from the transparent electrodes, to ensure the connection between the lead interconnects and the transparent electrodes and thus permit normal operation of the electrode substrate.

Solution to the Problem

To attain the above objective, according to the present disclosure, in order to prevent the oxidation-reduction reaction between lead interconnects and transparent electrodes and also reduce the membrane stress of the lead interconnects, contrivance has been made for the quality of the material of contact portions of the lead interconnects with the transparent electrodes.

Specifically, the present disclosure is directed to an electrode substrate having a base substrate; a transparent electrode made of a transparent conductive oxide provided on the base substrate; and a lead interconnect that is connected to the transparent electrode with one end thereof lying on the transparent electrode and is led out to an outer edge of the base substrate at the other end thereof, and a display device and a touch panel having the same, in which the following solving means is provided.

That is, the first disclosure is directed to an electrode substrate where a contact portion of the lead interconnect with the transparent electrode is formed of a high-melting metal nitride, and the nitride concentration is between 35 atoms/cm$^2$ and 65 atoms/cm$^2$ inclusive.

In the first disclosure, the contact portion of the lead interconnect with the transparent electrode is formed of a high-melting metal nitride. If the nitride concentration of the contact portion of the lead interconnect is less than 35 atoms/cm$^2$, the mutual oxidation-reduction reaction between the lead interconnect and the transparent electrode made of a transparent conductive oxide will not be reduced so sufficiently as to prevent peeling off of the lead interconnect. On the other hand, if the nitrogen concentration of the contact portion of the lead interconnect is more than 65 atoms/cm$^2$, a film deposited inside a film formation apparatus tends to peel off during film formation for forming the lead interconnect. This may serve as a particle source, causing troubles such as that a number of particles may adhere to the substrate surface and that particles may be mixed in the formed film. Moreover, since the specific resistance of the high-melting metal nitride is higher as the nitrogen concentration thereof is higher, there is the possibility that the interconnect resistance may become too high to allow the lead interconnect to function. In contrast to the above, according to the first disclosure, where the nitride concentration of the contact portion of the lead interconnect is equal to or more than 35 atoms/cm$^2$, the mutual oxidation-reduction reaction between the lead interconnect and the transparent electrode can be reduced sufficiently. Also, since the nitride concentration of the contact portion of the lead interconnect is equal to or less than 65 atoms/cm$^2$, generation of particles during the film formation for forming the lead interconnect is prevented or reduced, making it possible to prevent adhesion of particles to the substrate surface and mixing of particles in the formed film. Moreover, the conductivity of the lead interconnect can be secured permitting exertion of its function. In addition, since the crystal structure of the high-melting metal nitride is of a cubic system, which is the same crystal system as that of the transparent conductive oxide, the membrane stress remaining in the lead interconnect during the formation of the lead interconnect can be relieved. Therefore, peeling off of the lead interconnect from the transparent electrode can be prevented, ensuring the connection of the lead interconnect with the transparent electrode and thus permitting normal operation of the electrode substrate without causing defects.

The second disclosure is directed to the electrode substrate of the first disclosure further including: an insulating film covering the lead interconnect; and a connection terminal made of a transparent conductive oxide to which the lead interconnect is connected with a lead tip end thereof lying on the the connection terminal and that is placed outside the insulating film, wherein a contact portion of the lead interconnect with the connection terminal is also formed of a high-melting metal nitride, and the nitride concentration is between 35 atoms/cm$^2$ and 65 atoms/cm$^2$ inclusive.

In the second disclosure, since the lead interconnect is covered with the insulating film, moisture, etc. are blocked from entering from outside, and thus the lead interconnect is well prevented from corrosion. Moreover, since the connection terminal connected to the lead interconnect and placed outside the insulating film is made of a transparent conductive oxide, it is high in corrosion resistance, being resistant to corrode in the atmosphere. Therefore, in the connection with an external circuit, etc., it is possible to avoid such an event that, due to corrosion of the connection terminal, the resistance of the terminal may become high causing connection failure.

In addition, since the contact portion of the lead interconnect with the connection terminal is formed of a high-melting metal nitride and the nitride concentration thereof is between 35 atoms/cm$^2$ and 65 atoms/cm$^2$ inclusive, a similar action to that exerted between the lead interconnect and the transparent electrode is exerted between the lead interconnect and the connection terminal made of a transparent conductive oxide: peeling off of the lead interconnect from the connection terminal can be prevented, ensuring the connection between the lead interconnect and the connection terminal and thus permitting normal operation of the electrode substrate without causing defects.

The third disclosure is directed to the electrode substrate of the first or second disclosure where the lead interconnect is comprised of a barrier metal layer made of a high-melting metal nitride constituting the contact portion with the transparent electrode and a low-resistance metal layer made of a metal lower in resistance than the barrier metal layer stacked sequentially.

In the third disclosure, the lead interconnect has a multilayer structure having at least two layers where the barrier metal layer and the low-resistance metal layer are stacked sequentially. Since the barrier metal layer is made of a high-melting metal nitride and constitutes the contact portion with the transparent electrode, the effect of the first disclosure described above can be exerted concretely. Moreover, since the low-resistance metal layer is made of a metal lower in resistance than the barrier metal layer, the resistance is reduced compared with the case that the lead interconnect is made of only a high-melting metal nitride. Thus, the degree of conductivity required for the lead interconnect can be secured according to the device to which the present disclosure is applied.

The fourth disclosure is directed to the electrode substrate of any one of the first to third disclosures where the high-melting metal nitride is titanium nitride (TiN), molybdenum nitride (MoN), tantalum nitride (TaN), tungsten nitride (CrN), or chromium nitride (CrN).

In the fourth disclosure, the effect of the present disclosure can be exerted concretely, making it possible to prevent occurrence of a defective product including the electrode substrate and thus improve the problems of reduction in yield and increase in fabrication cost.

The fifth disclosure is directed to the electrode substrate of any one of the first to fourth disclosures where the transparent conductive oxide is ITO or an indium zinc oxide (IZO).

In the fifth disclosure, the transparent electrode is made of ITO or IZO. ITO and IZO have conductivity and yet have a comparatively high degree of transparency. Therefore, when the present disclosure is applied to an added function device such as a switching liquid crystal panel and a touch panel used by being overlaid on a display panel, good visibility can be secured for the display screen of the display panel.

The sixth disclosure is directed to a display device including: a display panel configured to generate a display image in correspondence with input image data; a parallax barrier means configured to present different specific viewing angles for a first display region and a second display region in the display image generated by the display panel; and a switching liquid crystal panel configured to switch between a first display state and a second display state by enabling or disabling the effect of the parallax barrier means, wherein the switching liquid crystal panel has the electrode substrate of any one of the first to fifth disclosures.

In the sixth disclosure, with the electrode substrate of any of the first to fifth disclosures having excellent characteristics of ensuring the connection between the lead interconnect and the transparent electrode and thus permitting normal operation of the electrode substrate without causing defects, the display device can also improve the problems of reduction in yield and increase in fabrication cost and thus achieve cost reduction.

The seventh disclosure is directed to a touch panel including the electrode substrate of any one of the first to fifth disclosures, wherein the touch panel has a touch region where the transparent electrode is provided and a touch position contacted by a contact body can be detected and a terminal region provided outside the touch region for connection with an external circuit, and the lead interconnect is led out from the touch region side to the terminal region side, and electrically connected, via the terminal region, to a controller for detecting a contact position of a contact body when the contact body contacts the position in the touch region.

In the seventh disclosure, with the electrode substrate of any of the first to fifth disclosures having excellent characteristics of ensuring the connection between the lead interconnect and the transparent electrode and thus permitting normal operation of the electrode substrate without causing defects, the touch panel can also improve the problems of reduction in yield and increase in fabrication cost and thus achieve cost reduction.

Advantages of the Disclosure

According to the present disclosure, since the contact portion of the lead interconnect with the transparent electrode is formed of a high-melting metal nitride and the nitride concentration is between 35 atoms/cm$^2$ and 65 atoms/cm$^2$ inclusive, peeling off of the lead interconnect from the transparent electrode can be prevented, ensuring the connection between the lead interconnect and the transparent electrode and thus permitting normal operation of the electrode substrate without causing defects. As a result, for electrode substrates and devices such as display devices and touch panels having the same, it is possible to improve the problems of reduction in yield and increase in fabrication cost and thus achieve cost reduction.

DESCRIPTION OF EMBODIMENTS

Embodiments of the present disclosure will be described hereinafter in detail with reference to the relevant drawings. Note however that the present disclosure is not limited to the embodiments to follow.

<<Embodiment 1>>

In Embodiment 1, a 2D/3D switchable liquid crystal display device 51 configured to be switchable between 2D display and 3D display will be described as an example of the display device.

Configuration of 2D/3D Switchable Liquid Crystal Display Device S1—

Figure 1:
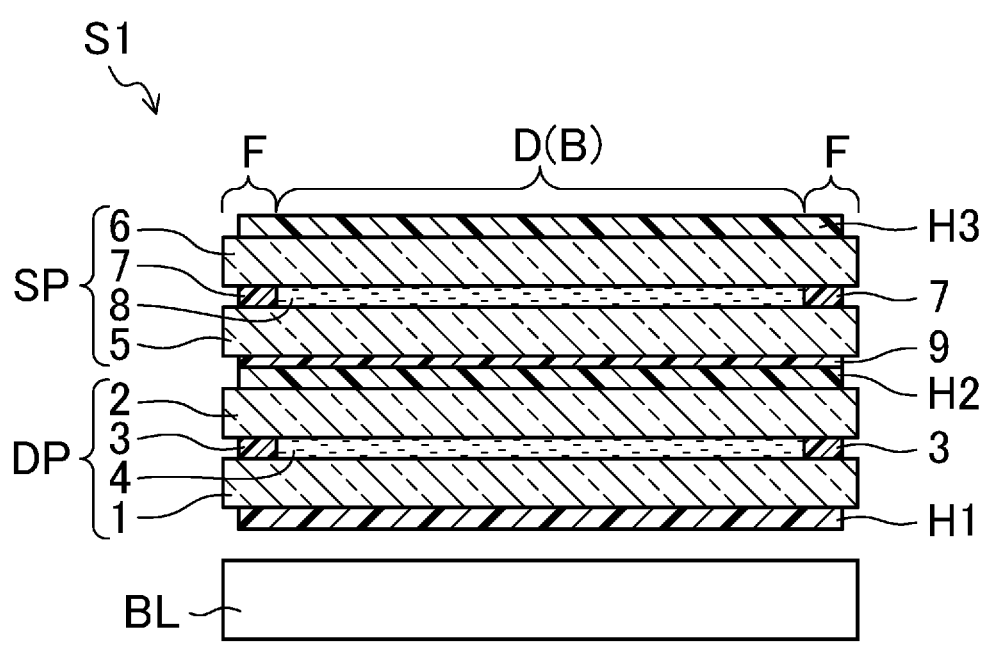
FIG. 1 is a cross-sectional view schematically showing the cross-sectional structure of a 2D/3D switchable liquid crystal display device in Embodiment 1.

The cross-sectional structure of the 2D/3D switchable liquid crystal display device 51 is shown in FIG. 1.

The 2D/3D switchable liquid crystal display device 51, which is a transmissive liquid crystal display device, includes a liquid crystal display panel DP, a backlight unit BL that is a light source device placed on the back-face side of the liquid crystal display panel DP, and a switching liquid crystal panel SP placed on the front-face side of the liquid crystal display panel DP, i.e., the side opposite to the backlight unit BL side.

<Configuration of Liquid Crystal Display Panel DP>

The liquid crystal display panel DP includes: a thin film transistor (TFT) substrate 1 and a counter substrate 2 opposed to each other; a frame-shaped sealing material 3 with which peripheral portions of the TFT substrate 1 and counter substrate 2 adhere to each other; and a liquid crystal layer 4 enclosed with the sealing material 3 to be sealed between the TFT substrate 1 and the counter substrate 2.

The liquid crystal display panel DP has a display region D in a rectangular shape, for example, for displaying an image in an area where the TFT substrate 1 and the counter substrate 2 face each other, and which is located inside the frame-shaped sealing material 3, i.e., where the liquid crystal layer 4 is formed. In the display region D, a plurality of pixels as the minimum units of an image are arranged in a matrix.

The liquid crystal display panel DP also has a non-display region in a rectangular frame shape, for example, surrounding the display region D, and has a terminal region (not shown) on one side of the non-display region where the TFT substrate 1 protrudes from the counter substrate 2 externally exposing the surface of the protruding portion of the TFT substrate 1 facing the counter substrate 2. In the terminal region, an interconnect substrate such as a flexible printed circuit (FPC) board is mounted via an anisotropic conductive film, and a signal for display including image data corresponding to an image to be displayed is input into the liquid crystal display panel DP from an external circuit via the interconnect substrate.

Although not shown, the TFT substrate 1 includes, on an insulating substrate such as a glass substrate as the base substrate: a plurality of gate interconnects provided to extend in parallel with one another; a plurality of source interconnects provided to extend in parallel with one another in a direction intersecting with the gate interconnects; and TFTs, as well as pixel electrodes connected to drains of the TFTs, provided to correspond to the respective pixels at the intersections between the gate interconnects and the source interconnects, and is configured so that, by switching on/off the TFTs, a potential is selectively applied to the pixel electrodes corresponding to the TFTs.

Although not shown, the counter substrate 2 includes, on an insulating substrate such as a glass substrate as the base substrate: a black matrix provided in a lattice shape to correspond to the gate interconnects and the source interconnects; a plurality of color filters including red layers, green layers, and blue layers periodically arranged in correspondence with the pixels in the squares of the lattice of the black matrix; a common electrode formed to cover the black matrix and the color filters to face the group of the pixel electrodes; and column-shaped photo spacers provided on the common electrode.

The TFT substrate 1 and the counter substrate 2, formed in a rectangular shape, for example, have respective alignment films (not shown) on their inner surfaces facing each other, and also have a first polarizing plate H1 and a second polarizing plate H2 on the outer surfaces thereof, respectively. The first polarizing plate H1 on the TFT substrate 1 and the second polarizing plate H2 on the counter substrate 2 have transmission axes different by 90° from each other. The liquid crystal layer 4 is formed of a nematic liquid crystal material, etc. having electrooptic characteristics, for example.

<Configuration of Backlight Unit BL>

Although not shown, the backlight unit BL includes a light source such as a light emitting diode (LED) and a cold-cathode tube, a light guide plate, and a plurality of optical sheets such as a reflection sheet, a diffusion sheet, and a prism sheet, and is configured so that light incident on the light guide plate from the light source is output as uniform planar light from the output plane of the light guide plate toward the liquid crystal display panel DP via the optical sheets.

<Configuration of Switching Liquid Crystal Panel SP>

The switching liquid crystal panel SP is stuck on the liquid crystal display panel DP via a sticking material 9 such as a double-sided adhesive tape. The switching liquid crystal panel SP includes: a drive substrate 5 and a common substrate 6 both of which are electrode substrates opposed to each other; a frame-shaped sealing material 7 with which peripheral portions of the drive substrate 5 and common substrate 6 adhere to each other; and a liquid crystal layer 8 enclosed with the sealing material 7 to be sealed between the drive substrate 5 and the common substrate 6.

The switching liquid crystal panel SP has a parallax barrier region B in a rectangular shape, for example, in an area where the drive substrate 5 and the common substrate 6 face each other, and which is located inside the frame-shaped sealing material 7, i.e., where the liquid crystal layer 8 is formed. The parallax barrier region B is placed to correspond to the display region D of the liquid crystal display panel DP and, as will be described later, configured to be able to exert its function as the parallax barrier having a lattice-shaped light-transmitting portion and light-shielding portions arranged in a matrix in the squares of the lattice of the light-transmitting portion.

The switching liquid crystal panel SP also has a frame region F in a rectangular frame shape, for example, surrounding the parallax barrier region B. The frame region F is placed in a region corresponding to the non-display region of the liquid crystal display panel DP. On one side of the frame region F, a drive terminal region DT (not shown in FIG. 1; see FIG. 2) is provided where the drive substrate 5 protrudes from the common substrate 6 externally exposing the surface of the protruding portion of the drive substrate 5 facing the common substrate 6. Also, on the other side of the frame region F, a common terminal region CT (not shown in FIG. 1; see FIG. 5) is provided where the common substrate 6 protrudes from the drive substrate 5 externally exposing the surface of the protruding portion of the common substrate 6 facing the drive substrate 5. In each of the terminal regions DT and CT, an interconnect substrate such as a FPC board is mounted via an anisotropic conductive film, and a control signal for controlling on/off of the drive state is input into the switching liquid crystal panel SP from an external circuit via the interconnect substrate.

<Configuration of Drive Substrate 5>

Figure 2:
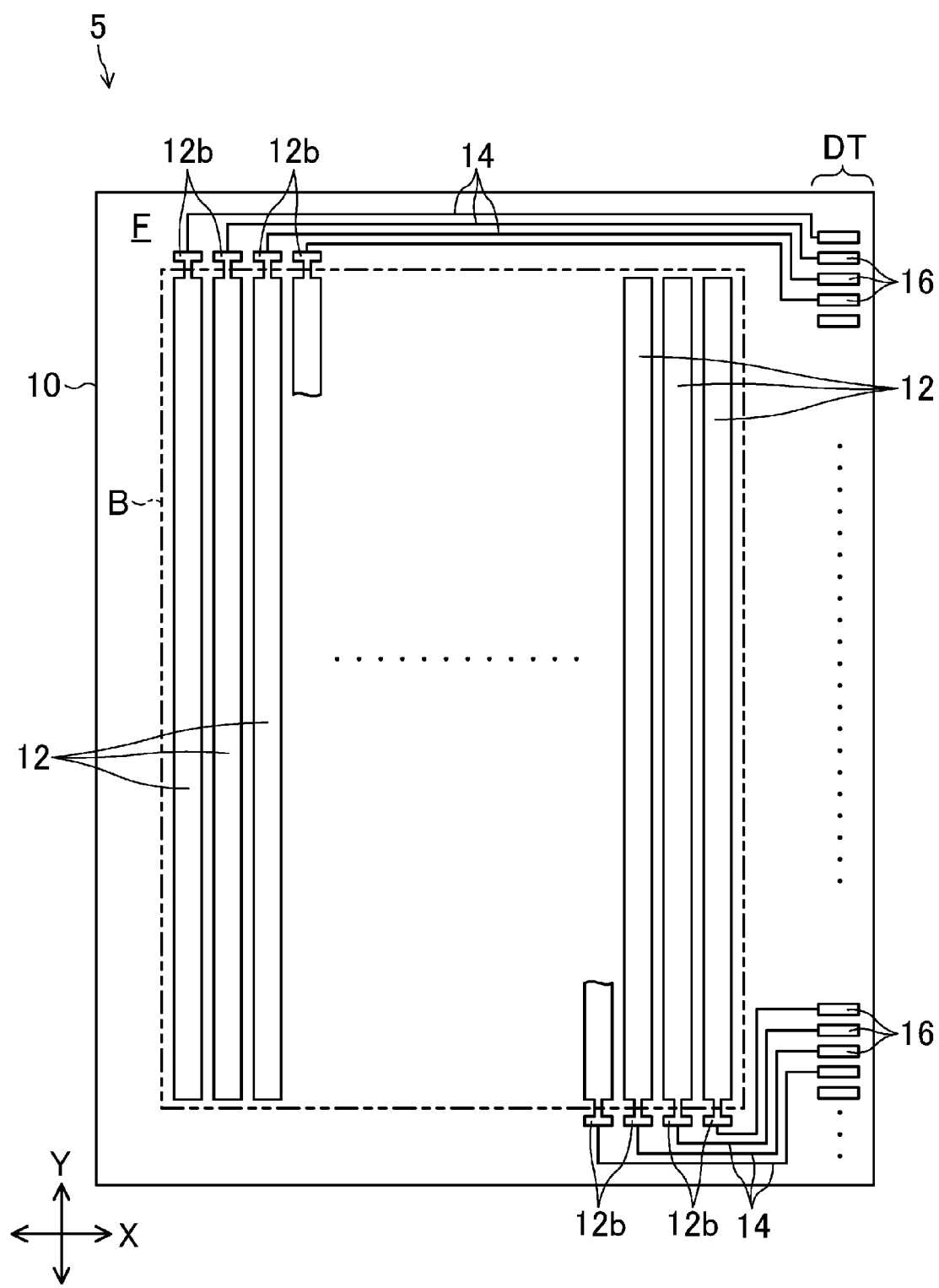
FIG. 2 is a plan view schematically showing a drive substrate.
Figure 3:
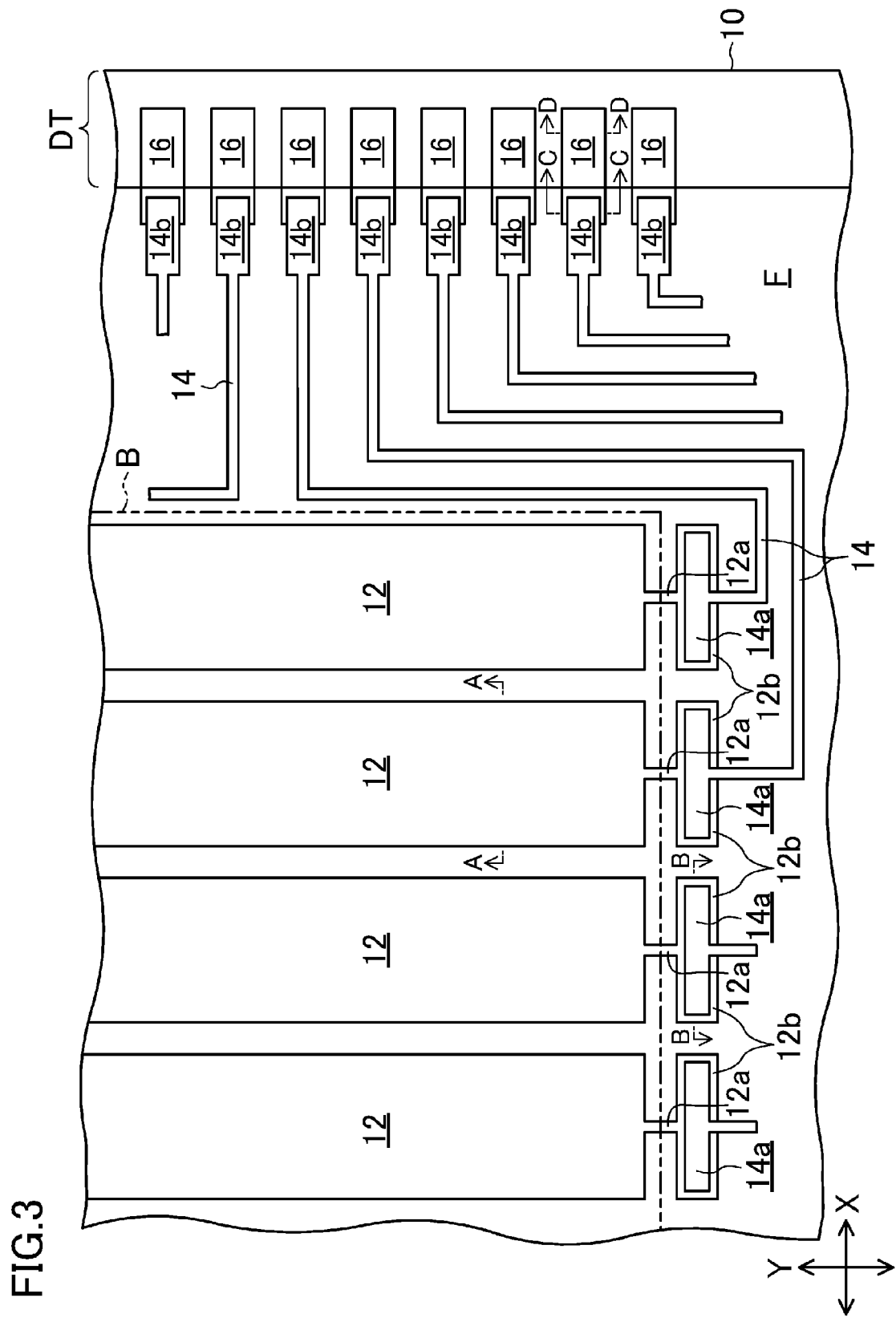
FIG. 3 is a plan view schematically showing a connection structure between switch electrodes and external connection terminals of the drive substrate in a partial enlarged view.
Figure 4:
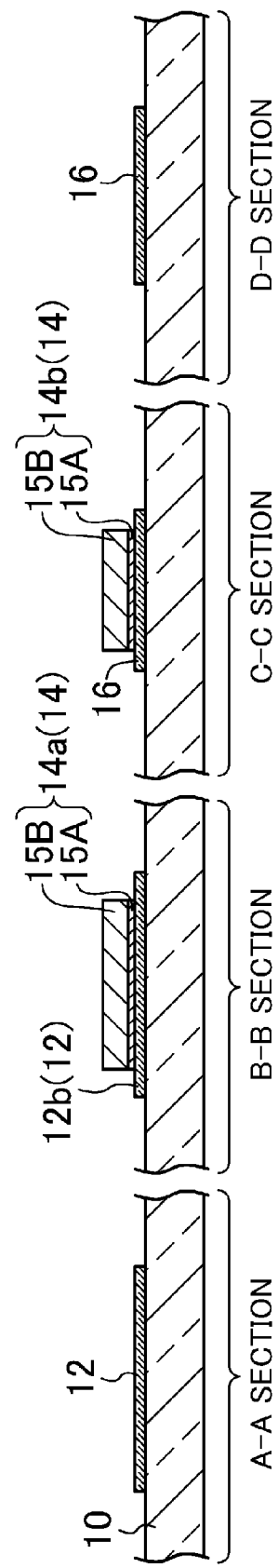
FIG. 4 includes cross-sectional views showing cross-sectional structures taken along lines A-A, B-B, C-C, and D-D in FIG. 3.

The configuration of the drive substrate 5 is shown in FIGS. 2 to 4. FIG. 2 is a schematic plan view of the drive substrate 5, FIG. 3 is a plan view schematically showing a connection structure between switch electrodes 12 and external connection terminals 16 of the drive substrate 5 in a partial enlarged view, and FIG. 4 includes cross-sectional views showing cross-sectional structures taken along lines A-A, B-B, C-C, and D-D in FIG. 3.

As shown in FIG. 2, the drive substrate 5 includes, on an insulating substrate 10 such as a glass substrate as the base substrate: a plurality of drive switch electrodes 12 arranged in a striped shape in the parallax barrier region B; lead interconnects 14 each electrically connected to each of the drive switch electrodes 12 and led out in the frame region F from the parallax barrier region B side to the drive terminal region DT side for each switch electrode 12; and the external connection terminals 16 each provided at the lead destination of each lead interconnect 14. The drive switch electrodes 12 are each formed in an elongate rectangular shape linearly extending in the up-and-down direction in FIG. 2 (Y-axis direction; e.g., the vertical direction on the screen), and are arranged with a predetermined spacing therebetween in the side-to-side direction in FIG. 2 (X-axis direction; e.g., the horizontal direction on the screen) forming space between the adjacent switch electrodes 12. On one end of each of the drive switch electrodes 12, as shown in FIG. 3, an interconnect 12a is led out from the switch electrode 12, and an internal connection terminal 12b is formed at the tip of the interconnect 12a. Such drive switch electrodes 12, made of ITO or IZO as a transparent conductive oxide, constitute the transparent electrodes according to the present disclosure.

The external connection terminals 16 are arranged in a row along an edge of the insulating substrate 10 with a predetermined spacing therebetween. Such external connection terminals 16, made of ITO or IZO as a transparent conductive oxide, are formed from the same film as that forming the drive switch electrodes 12.

The lead interconnects 14 extend alongside one another from near the parallax barrier region B up to immediately before the drive terminal region DT. Each of the lead interconnects 14 is connected to the corresponding internal connection terminal 12b with its lead base end 14a lying on the internal connection terminal 12b, and connected to the corresponding external connection terminal 16 with its lead tip end 14b lying on the external connection terminal 16. As shown in FIG. 4 (B-B section and C-C section), the lead interconnect 14 is formed of a barrier metal layer 15A and a low-resistance metal layer 15B.

The barrier metal layer 15A constitutes each of contact portions with the internal connection terminal 12b and the external connection terminal 16. The barrier metal layer 15A is made of titanium nitride (TiN) that is a high-melting metal nitride, and has a nitrogen concentration in a range between 35 atoms/cm$^2$ and 65 atoms/cm$^2$ inclusive and a specific resistance in a range between 150 μΩcm and 500 μΩcm inclusive. The low-resistance metal layer 15B is made of titanium (Ti) lower in resistance than titanium nitride (TiN), and has a specific resistance in a range between 60 μΩcm and 75 μΩcm inclusive.

As described above, since the contact portions of the lead interconnect 14 with the internal connection terminal 12b and the external connection terminal 16 are made of titanium nitride (TiN) having a nitrogen concentration of 35 atoms/cm$^2$ to 65 atoms/cm$^2$, the lead interconnect 14 can be prevented from peeling off from the connection terminals 12b and 16.

That is, by forming the contact portions of the lead interconnect 14 with the internal connection terminal 12b and the external connection terminal 16 using titanium nitride (TiN), the effect of preventing or reducing the mutual oxidation-reduction reaction between the lead interconnect 14 and the connection terminals 12b and 16 can be obtained. If the nitrogen concentration of the contact portions of the lead interconnect 14 is less than 35 atoms/cm$^2$, the mutual oxidation-reduction reaction between the lead interconnect 14 and the connection terminals 12b and 16 will not be reduced so sufficiently as to prevent peeling off of the lead interconnect 14. On the other hand, if the nitrogen concentration of the contact portions of the lead interconnect 14 is more than 65 atoms/cm$^2$, a film deposited inside a film formation apparatus will tend to peel off during the film formation for forming the lead interconnect 14. This may serve as a particle source, causing troubles such as that a number of particles may adhere to the substrate surface and that particles may be mixed in the formed film. Moreover, since the specific resistance of titanium nitride (TiN) becomes higher as the nitrogen concentration thereof is higher, there is the possibility that the interconnect resistance may become too high to allow the lead interconnect 14 to function.

In contrast to the above, in this embodiment, since the nitrogen concentration of the barrier metal layer 15A constituting each of the contact portions of the lead interconnect 14 with the internal connection terminal 12b and the external connection terminal 16 is 35 atoms/cm$^2$ or more, the mutual oxidation-reduction reaction between the lead interconnect 14 and the connection terminals 12b and 16 can be reduced sufficiently. Also, since the nitrogen concentration of the barrier metal layer 15A is 65 atoms/cm$^2$ or less, generation of particles during the film formation for forming the lead interconnect 14 is prevented or reduced, making it possible to prevent adhesion of particles to the substrate surface and mixing of particles in the formed film. Moreover, the specific resistance of the barrier metal layer 15A can be reduced to a range where the conductivity required for interconnects can be secured. Furthermore, with the low-resistance metal layer 15B stacked on the barrier metal layer 15A, the resistance of the lead interconnect 14 can be reduced compared with the case of forming the lead interconnect 14 from only titanium nitride (TiN), and thus the conductivity required for the lead interconnect 14 of the drive substrate 5 can be secured. In addition, since the crystal structure of titanium nitride (TiN) is of a cubic system, which is the same crystal system as that of transparent conductive oxides such as ITO and IZO, the membrane stress remaining in the lead interconnect 14 during the formation of the lead interconnect 14 can be relieved. Therefore, peeling off of the lead interconnect 14 from the internal connection terminal 12b and the external connection terminal 16 can be prevented.

The nitrogen concentration of the barrier metal layer 15A is preferably between 35 atoms/cm$^2$ and 65 atoms/cm$^2$ inclusive, more preferably between 40 atoms/cm$^2$ and 50 atoms/cm$^2$ inclusive, from the standpoint of preventing or reducing the oxidation-reduction reaction between the barrier metal layer 15A and the connection terminals 12b and 16 as described above.

Note that, although the barrier metal layer 15A has been described as being made of titanium nitride (TiN) in this embodiment, it may be formed of molybdenum nitride (MoN), tantalum nitride (TaN), tungsten nitride (WN), or chromium nitride (CrN), or formed of any of other high-melting metals, in place of TiN. Also, the low-resistance metal layer 15B is not limited to titanium (Ti), but, instead of this, may be formed of molybdenum (Mo), tantalum (Ta), tungsten (W), or chromium (Cr), or formed of any of other high-melting metals.

<Configuration of Common Substrate 6>

Figure 5:
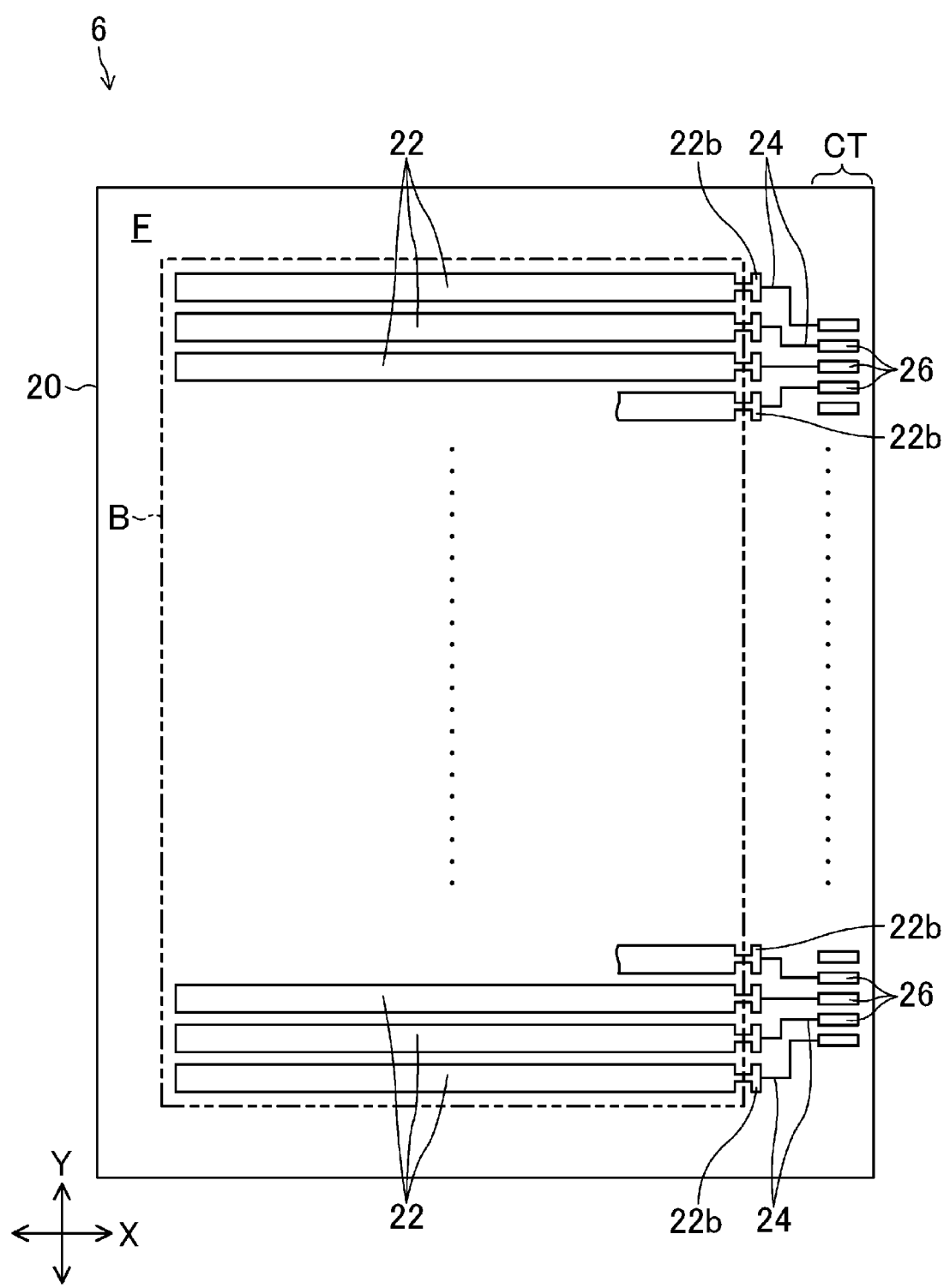
FIG. 5 is a plan view schematically showing a common substrate.
Figure 6:
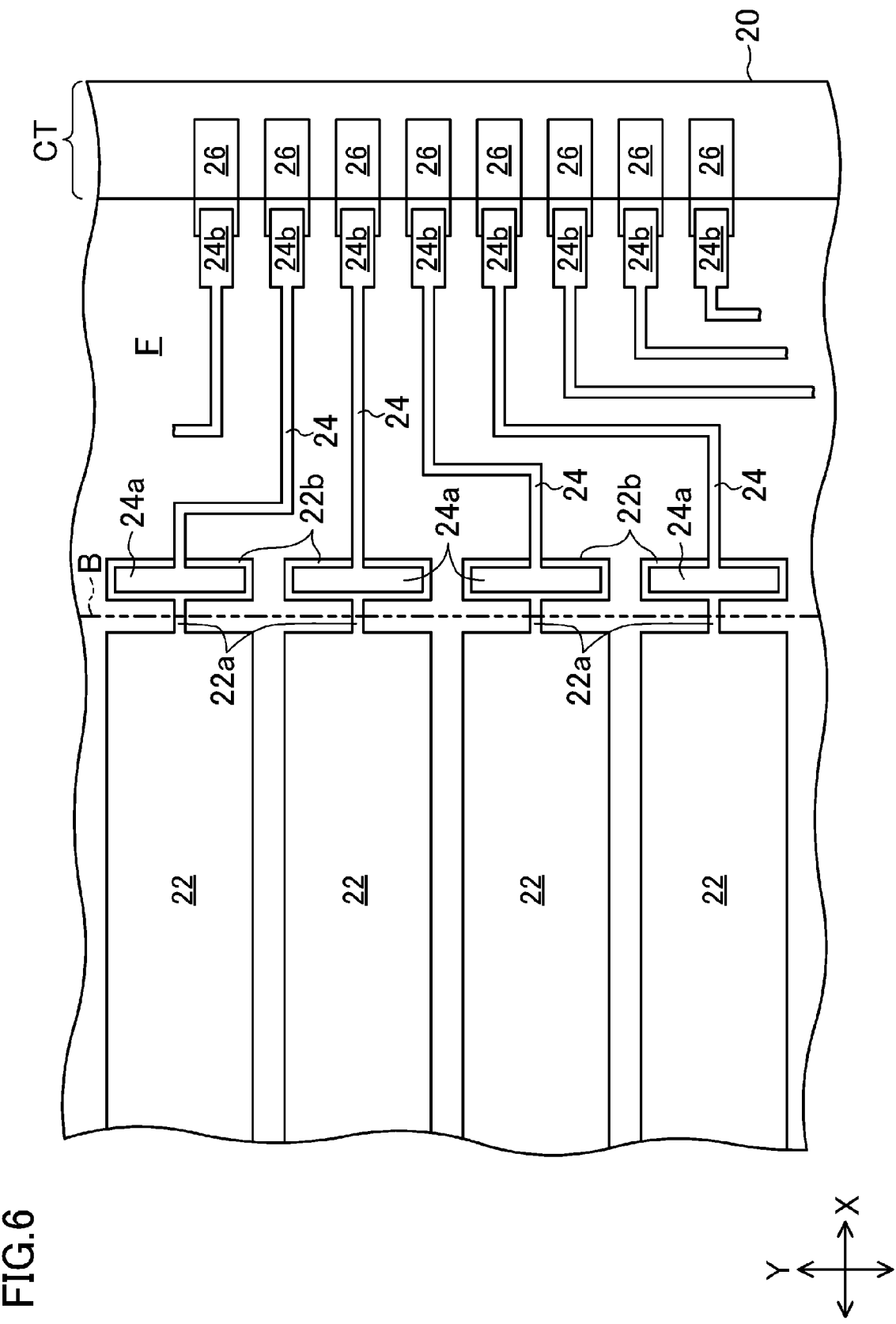
FIG. 6 is a plan view schematically showing a connection structure between switch electrodes and external connection terminals of the common substrate in a partial enlarged view.

The configuration of the common substrate 6 is shown in FIGS. 5 and 6. FIG. 5 is a schematic plan view of the common substrate 6, and FIG. 6 is a plan view schematically showing a connection structure of switch electrodes 22 and external connection terminals 26 of the common substrate 6 in a partial enlarged view.

As shown in FIG. 5, the common substrate 6 includes, on an insulating substrate 20 such as a glass substrate as the base substrate: a plurality of common switch electrodes 22 arranged in a striped shape in the parallax barrier region B; lead interconnects 24 each electrically connected to each of the common switch electrodes 22 and led out in the frame region F from the parallax barrier region B side to the common terminal region CT side for each switch electrode 22; the external connection terminals 26 each provided at the lead destination of each the lead interconnect 24.

The common switch electrodes 22 are each formed in an elongate rectangular shape linearly extending in the X-axis direction to intersect with the drive switch electrodes 12, and are arranged with a predetermined spacing therebetween in the Y-axis direction forming space between the adjacent switch electrodes 22. On one end of each of the common switch electrodes 22, as shown in FIG. 6, an interconnect 22a is lead out from the switch electrode 22, and an internal connection terminal 22b is formed at the tip of the interconnect 22a. Such common switch electrodes 22, made of ITO or IZO as a transparent conductive oxide, also constitute the transparent electrodes according to the present disclosure.

The external connection terminals 26 are arranged in a row along an edge of the insulating substrate 20 with a predetermined spacing therebetween. Such external connection terminals 26, made of ITO or IZO that is a transparent conductive oxide, are formed from the same film as that forming the common switch electrodes 22.

The lead interconnects 24 extend alongside one another from near the parallax barrier region B up to immediately before the common terminal region CT. Each of the lead interconnects 24 is connected to the corresponding internal connection terminal 22b with its lead base end 24a lying on the internal connection terminal 22b, and connected to the corresponding external connection terminal 26 with its lead tip end 24b lying on the external connection terminal 26.

Like the lead interconnects 14 of the drive substrate 5, the lead interconnects 24 are each formed of a barrier metal layer made of titanium nitride (TiN) having a nitrogen concentration between 35 atoms/cm$^2$ and 65 atoms/cm$^2$ inclusive (preferably, between 40 atoms/cm$^2$ and 50 atoms/cm$^2$ inclusive) and a low-resistance metal layer made of titanium (Ti) stacked sequentially. Therefore, in the common substrate 6, also, a similar action to that of the drive substrate 5 is exerted between the lead interconnects 24 and the internal and external connection terminals 22b and 26, preventing peeling off of the lead interconnects 24 from the connection terminals 22b and 26.

Note that, although the barrier metal layer of the lead interconnect 24 has been described as being made of titanium nitride (TiN) in this embodiment, it may be formed of molybdenum nitride (MoN), tantalum nitride (TaN), tungsten nitride (WN), or chromium nitride (CrN), or formed of any of other high-melting metals, in place of TiN. Also, the low-resistance metal layer of the lead interconnect 24 is not limited to titanium (Ti), but, instead of this, may be formed of molybdenum (Mo), tantalum (Ta), tungsten (W), or chromium (Cr), or formed of any of other high-melting metals.

The drive substrate 5 and the common substrate 6 described above are formed in a rectangular shape, for example, and an alignment film (not shown) is formed on each of the inner surfaces thereof facing each other. Further, a third polarizing plate H3 is provided on the outer surface of the common substrate 6. The third polarizing plate H3 on the common substrate 6 is the same in the direction of the transmission axis as the second polarizing plate H2 on the counter substrate 2. The liquid crystal layer 8 is formed of a nematic liquid crystal material, etc. having electrooptic characteristics, for example.

<Operation of 2D/3D Switchable Liquid Crystal Display Device S1>

In the liquid crystal display device S1 having the above-described configuration, image display is performed in either the 2D display state as the first display state where normal 2D display is performed and the 3D display state as the second display state where 3D display is performed by letting the right and left eyes of an observer visually recognize images viewed from different points of view thereby giving parallax.

In the liquid crystal display panel DP during its display operation, a gate signal is fed to the gate interconnects sequentially to drive the gate interconnects, and when TFTs connected to the same gate interconnect driven are turned on in unison, a source signal is fed to an on-state TFT via the source interconnect, to allow predetermined charge to be written into the corresponding pixel electrode via the TFT. Such a selective write operation of charge into the pixel electrode is performed for all rows of pixels constituting the display region D in a line-sequential manner. By this operation, a potential difference occurs between each pixel electrode of the TFT substrate 1 and the common electrode of the counter substrate 2, causing application of a predetermined voltage across the liquid crystal layer 4. In the liquid crystal display panel DP, the aligned state of liquid crystal molecules is changed with the magnitude of the voltage applied across the liquid crystal layer 4, thereby adjusting the transmittance of light from the backlight unit BL by the liquid crystal layer 4, to display an image.

During the display operation in the 3D display state, displayed on the liquid crystal display panel DP is a composite image where a right-eye image and a left-eye image are each divided into a plurality of vertical strips in the screen horizontal direction, and mixed in such a manner that such vertical strips of the right-eye image and the left-eye image are arranged alternately.

In the switching liquid crystal panel SP in the 3D display state, the drive of this panel is turned on, permitting different potentials to be applied to the drive switch electrodes 12 and the common switch electrodes 22 in unison. At this time, a predetermined voltage is applied between the drive switch electrodes 12 and the common switch electrodes 22, causing the polarization axis of light having passed through regions where the drive switch electrodes 12 and the common switch electrodes 22 overlap to change 90° with respect to the polarization axis of light having passed through regions located between the overlap regions of these switch electrodes 12 and 22. Thus, the light having passed through the overlap regions of the switch electrodes 12 and 22, which has a polarization axis forming 90° with the transmission axis of the third polarizing plate H3, does not pass through the third polarizing plate H3. By contrast, the light having passed through the non-overlap regions located between the overlap regions of these switch electrodes 12 and 22, which has a polarization axis parallel to the transmission axis of the third polarizing plate H3, passes through the third polarizing plate H3.

In this embodiment, by the optical action involving the switching liquid crystal panel SP and the third polarizing plate H3, the regions where the drive switch electrodes 12 and the common switch electrodes 22 overlap serve as light-shielding portions, and the regions where these switch electrodes do not overlap serve as light-transmitting portions. In the parallax barrier region, therefore, the function as a parallax barrier having a lattice-shaped light-transmitting portion and light-shielding portions arranged in a matrix in the squares of the lattice of the light-transmitting portion can be effectively exerted. In other words, the switching liquid crystal panel SP and the third polarizing plate H3 constitute the parallax barrier according to the present disclosure.

Through the mediation of the parallax barrier constituted by the switching liquid crystal panel SP and the third polarizing plate H3, the composite image of the right-eye image and the left-eye image displayed on the liquid crystal display panel DP is separated to have predetermined viewing angles different between the right-eye image and the left-eye image so that images observed from different points of view can be visually recognized by the right and left eyes of an observer, whereby 3D display is performed. At this time, with the parallax barrier having light-shielding portions arranged in a matrix, even when the display screen is rotated 90° to switch between portrait and landscape orientations, the right-eye image and left-eye image of the composite image displayed on the liquid crystal display panel DP can be separated to have their predetermined viewing angles by also rotating the composite image 90° in the same direction, whereby desired 3D display can be achieved. In this embodiment, in the liquid crystal display panel DP, the region constituted by pixels corresponding to the right-eye image and the region constituted by pixels corresponding to the left-eye image are respectively the first display region and the second display region.

By contrast, during the display operation in the 2D display state, displayed on the liquid crystal display panel DP is a normal two-dimensional plane image. In the switching liquid crystal panel SP, the drive of this panel is turned off, permitting the same potential to be applied to the drive switch electrodes 12 and the common switch electrodes 22, whereby the function as the parallax barrier is disabled allowing the incident light to exit with its polarizing axis unchanged. Thus, the same image is visually recognized by both eyes of an observer, performing 2D display.

—Fabrication Method—

Next, a fabrication method for the 2D/3D switchable liquid crystal display device S1 will be described by way of example. In this embodiment, a single wafer type fabrication method will be described as an example, where the drive substrate 5 and the common substrate 6 are fabricated one by one, and such substrates 5 and 6 are bonded together to fabricate one switching liquid crystal panel SP. However, this embodiment is also applicable to a multiphase type fabrication method where a mother panel including a plurality of cell units is manufactured, and such a mother panel is divided into the cell units to manufacture a plurality of switching liquid crystal panels SP simultaneously. This also applies to the liquid crystal display panel DP.

The fabrication method for the 2D/3D switchable liquid crystal display device S1 includes a switching liquid crystal panel fabrication process, a liquid crystal display panel fabrication process, a backlight unit fabrication process, and a modularizing process.

<Switching Liquid Crystal Panel Fabrication Process>

The switching liquid crystal panel fabrication process includes a drive substrate fabrication process, a common substrate fabrication process, and a bonding process.

<Drive Substrate Fabrication Process>

Figure 7A:
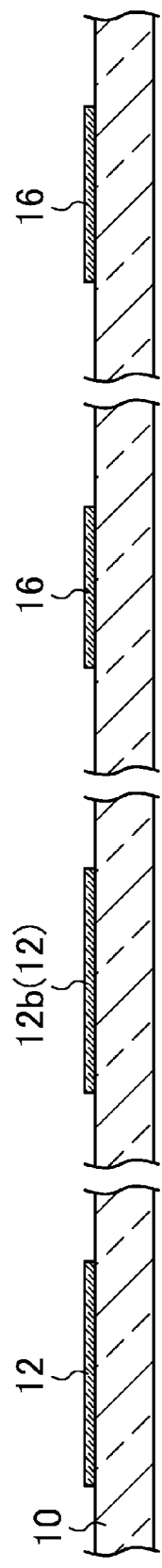
FIG. 7 is a process chart showing a fabrication method for the drive substrate in Embodiment 1, which includes cross-sectional views showing portions corresponding to those in FIG. 4.
Figure 7B:
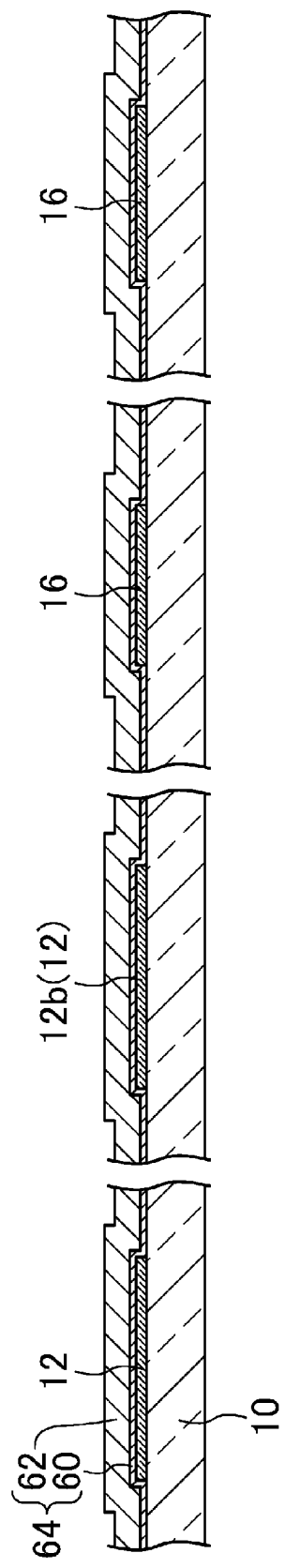
Figure 7C:
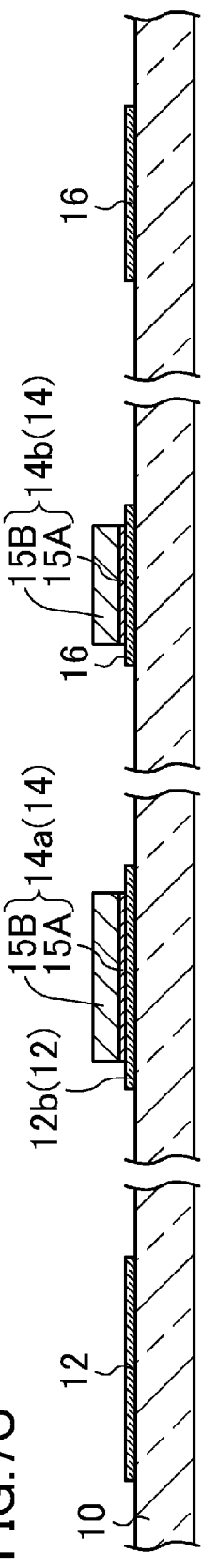

The drive substrate fabrication process is shown in FIGS. 7(a) to 7(c), each of which shows cross sections of portions corresponding to those in FIG. 4.

First, a transparent conductive film made of ITO or IZO having a cubic bixbyite type structure is formed on the previously-prepared insulating substrate 10 such as a glass substrate by sputtering. The transparent conductive film is then patterned by photolithography to form the drive switch electrodes 12 and the external connection terminals 16 as shown in FIG. 7(a).

Thereafter, as shown in FIG. 7(b), a titanium nitride (TiN) film 60 having a cubic sodium chloride (NaCl)-type structure and a titanium (Ti) film 62 having a hexagonal crystal structure are formed sequentially on the substrate having the drive switch electrodes 12 and the external connection terminals 16 formed thereon by sputtering, to form a metal multilayer film 64 of these films. The metal multilayer film 64 is then patterned by photolithography to form the lead interconnects 14 as shown in FIG. 7(c).

Thus, the drive substrate 5 can be fabricated.

<Common Substrate Fabrication Process>

As in the drive substrate fabrication process described above, the common switch electrodes 22, the lead interconnects 24, and the external connection terminals 26 are formed on the previously-prepared insulating substrate 20 such as a glass substrate by repeating the photolithographic steps, to fabricate the common substrate 6.

<Bonding Process>

An alignment film is formed on each of the surfaces of the drive substrate 5 and the common substrate 6 by printing, etc, and then rubbed as required. Subsequently, the sealing material 7 made of an UV-cured resin is drawn into a frame shape on the surface of the drive substrate 5 or the common substrate 6 by a dispenser, etc., and then a predetermined amount of a liquid crystal material is dropped into the inner region of the frame-shaped sealing material 7.

Thereafter, the drive substrate 5 and the common substrate 6 are bonded together via the sealing material 7 and the liquid crystal material under a reduced pressure, to form the liquid crystal layer 8. The resultant bonded body is then exposed to the atmospheric pressure thereby pressurizing the surfaces of the bonded body. Further, under this state, the sealing material 7 is irradiated with UV to be cured, to allow the drive substrate 5 and the common substrate 6 to adhere to each other, thereby fabricating the switching liquid crystal panel SP. Thereafter, the third polarizing plate H3 is stuck on the outer surface of the drive substrate 5.

<Liquid Crystal Display Panel Fabrication Process>

The liquid crystal display panel fabrication process includes a TFT substrate fabrication process, a counter substrate fabrication process, and a bonding process.

<TFT Substrate Fabrication Process>

The gate interconnects, the source interconnects, the TFTs, and the pixel electrodes are formed on a previously-prepared insulating substrate such as a glass substrate by a known method including repetition of photolithographic steps, thereby forming the TFT substrate 1.

<Counter Substrate Fabrication Process>

The black matrix, the color filters, the common electrode, and the photo spacers are formed on a previously-prepared insulating substrate such as a glass substrate by a known method including repetition of photolithographic steps, thereby forming the counter substrate 2.

<Bonding Process>

An alignment film is formed on each of the surfaces of the TFT substrate 1 and the counter substrate 2 and then rubbed as required. Subsequently, as in the bonding process in the switching liquid crystal panel fabrication process, the TFT substrate 1 and the counter substrate 2 are bonded together to form the liquid crystal layer 4, and the sealing material 3 is cured to allow the TFT substrate 1 and the counter substrate 2 to adhere to each other, thereby fabricating the liquid crystal display panel DP. Thereafter, the first polarizing plate H1 and the second polarizing plate H2 are respectively stuck on the outer surfaces of the TFT substrate 1 and the counter substrate 2.

<Backlight Unit Fabrication Process>

First, an acrylic resin plate that is to be the base of the light guide plate is formed using a known injection molding apparatus, etc., and a dot pattern, for example, for scattering light is formed on the acrylic resin plate, thereby fabricating the light guide plate. Thereafter, optical sheets such as the reflection sheet, the diffusion sheet, and the prism sheet are stuck on the light guide plate and assembled. A light source such as an LED and a cold-cathode tube is then attached to the bonded body of the light guide plate and the optical sheets, thereby fabricating the backlight unit BL.

<Modularizing Process>

An interconnect substrate such as a FPC board is mounted on each of the terminal regions DT and CT of the switching liquid crystal panel SP and the liquid crystal display panel DP via an anisotropic conductive film. Thereafter, the switching liquid crystal panel SP and the liquid crystal display panel DP are bonded together via the sticking material 9 such as a double-sided adhesive tape, and then the backlight unit BL is mounted on the back-face side of the liquid crystal display panel DP. In this way, the switching liquid crystal panel SP, the liquid crystal display panel DP, and the backlight unit BL are modularized.

By performing the above-described processes, the 2D/3D switchable liquid crystal display device S1 shown in FIG. 1 can be fabricated.

—Advantage of Embodiment 1—

In Embodiment 1, the barrier metal layer 15A constituting each of the contact portions of the lead interconnect 14 of the drive substrate 5 with the internal connection terminal 12b and the external connection terminal 16 is formed of titanium nitride (TiN), and the nitride concentration thereof is between 35 atoms/cm$^2$ and 65 atoms/cm$^2$ inclusive. Thus, peeling off of the lead interconnect 14 from the connection terminals 12b and 16 can be prevented, ensuring the connection of the lead interconnect 14 with the connection terminals 12b and 16 and thus permitting normal operation of the drive substrate 5 without causing defects.

Also, since the lead interconnects 24 of the common substrate 6 have a configuration similar to that of the lead interconnects 14 of the drive substrate 5, the lead interconnects 24 can also be prevented from peeling off from the internal connection terminals 22b and the external connection terminals 26, ensuring the connection of the lead interconnects 24 with the connection terminals 22b and 26 and thus permitting normal operation of the common substrate 6 without causing defects.

Accordingly, in the switching liquid crystal panel SP and the 2D/3D switchable liquid crystal display device S1 having the same, the problems of reduction in yield and increase in fabrication cost can be improved, and thus cost reduction can be achieved.

<<Alteration of Embodiment 1>>

Figure 8:
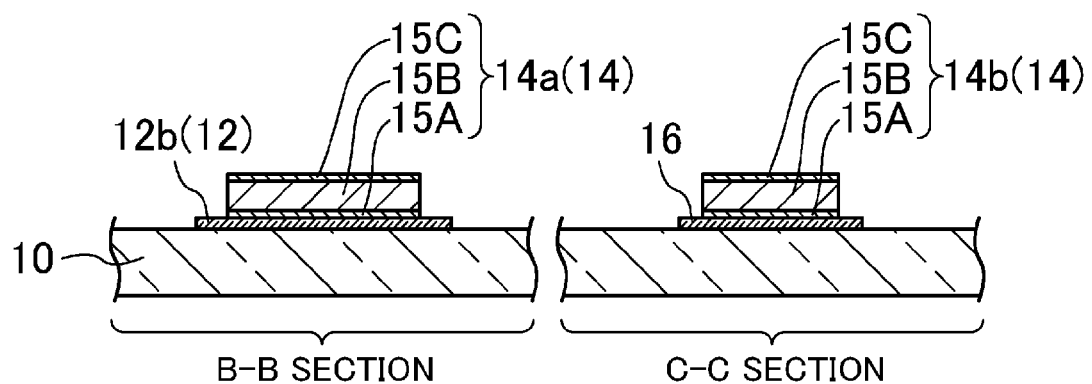
FIG. 8 includes cross-sectional views of portions corresponding to the sections taken along lines B-B and C-C in FIG. 4, showing the structure of lead interconnects in an alteration of Embodiment 1.

FIG. 8 includes cross-sectional views showing the structure of the lead interconnect 14 in an alteration of Embodiment 1, showing portions corresponding to the sections taken along lines B-B and C-C in FIG. 4 from left to right in the figure.

While the lead interconnect 14 has been described to have a two-layer structure (Ti/TiN) of the barrier metal layer 15A made of titanium nitride (TiN) and the low-resistance metal layer 15B made of titanium (Ti) stacked sequentially in Embodiment 1, the lead interconnect 14 in this alteration has a three-layer structure (TiN/Ti/TiN) of the barrier metal layer 15A made of titanium nitride (TiN), the low-resistance metal layer 15B made of titanium (Ti), and a metal nitride layer 15C made of titanium nitride (TiN) stacked sequentially.

The drive substrate 5 having the lead interconnects 14 of such a multilayer structure can be fabricated in the following manner: a titanium nitride (TiN) film is further formed, subsequent to the formation of the titanium nitride (TiN) film 60 and the titanium (Ti) film 62, by sputtering on the substrate on which the drive switch electrodes 12 and the external connection terminals 16 have been formed, forming the metal multilayer film of the three-layer structure, and the metal multilayer film is patterned by photolithography to form the lead interconnects 14.

Note that, although the structure of the lead interconnects 14 of the drive substrate 5 has been described in this alteration, a similar structure can also be used for the lead interconnects 24 of the common substrate 6.

<<Embodiment 2>>

In Embodiment 2, a case of applying the present disclosure to a touch panel will be described, where, using a liquid crystal display device as an example of the display device, a touch panel TP-attached liquid crystal display device S2 will be described.

—Configuration of Touch Panel TP-attached Liquid Crystal Display Device S2—

Figure 9:
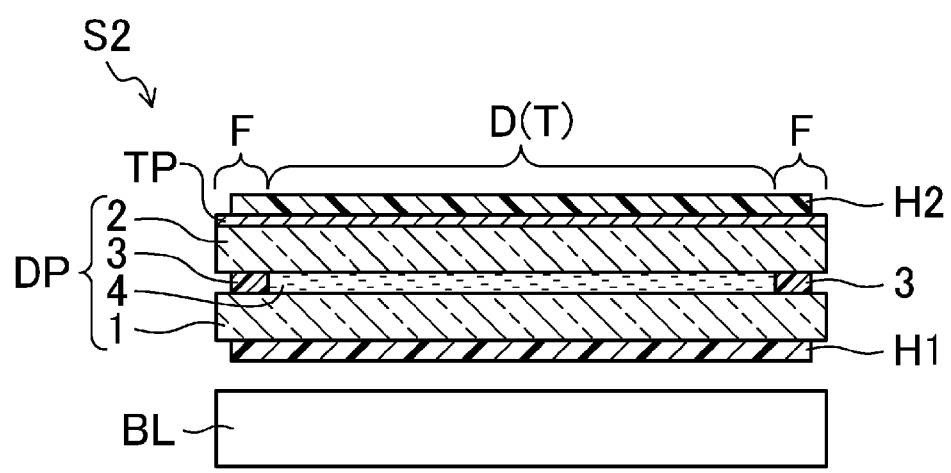
FIG. 9 is a cross-sectional view schematically showing the cross-sectional structure of a touch panel-equipped liquid crystal display device in Embodiment 2.

The cross-sectional structure of the touch panel TP-attached liquid crystal display device S2 is shown in FIG. 9.

The touch panel TP-attached liquid crystal display device S2, which is a transmissive liquid crystal display device, includes a liquid crystal display panel DP and a backlight unit BL, both of which have configurations similar to those in Embodiment 1, and a touch panel TP that is an electrode substrate placed on the front-face side of the liquid crystal display panel DP.

<Configuration of Touch Panel TP>

Figure 10:
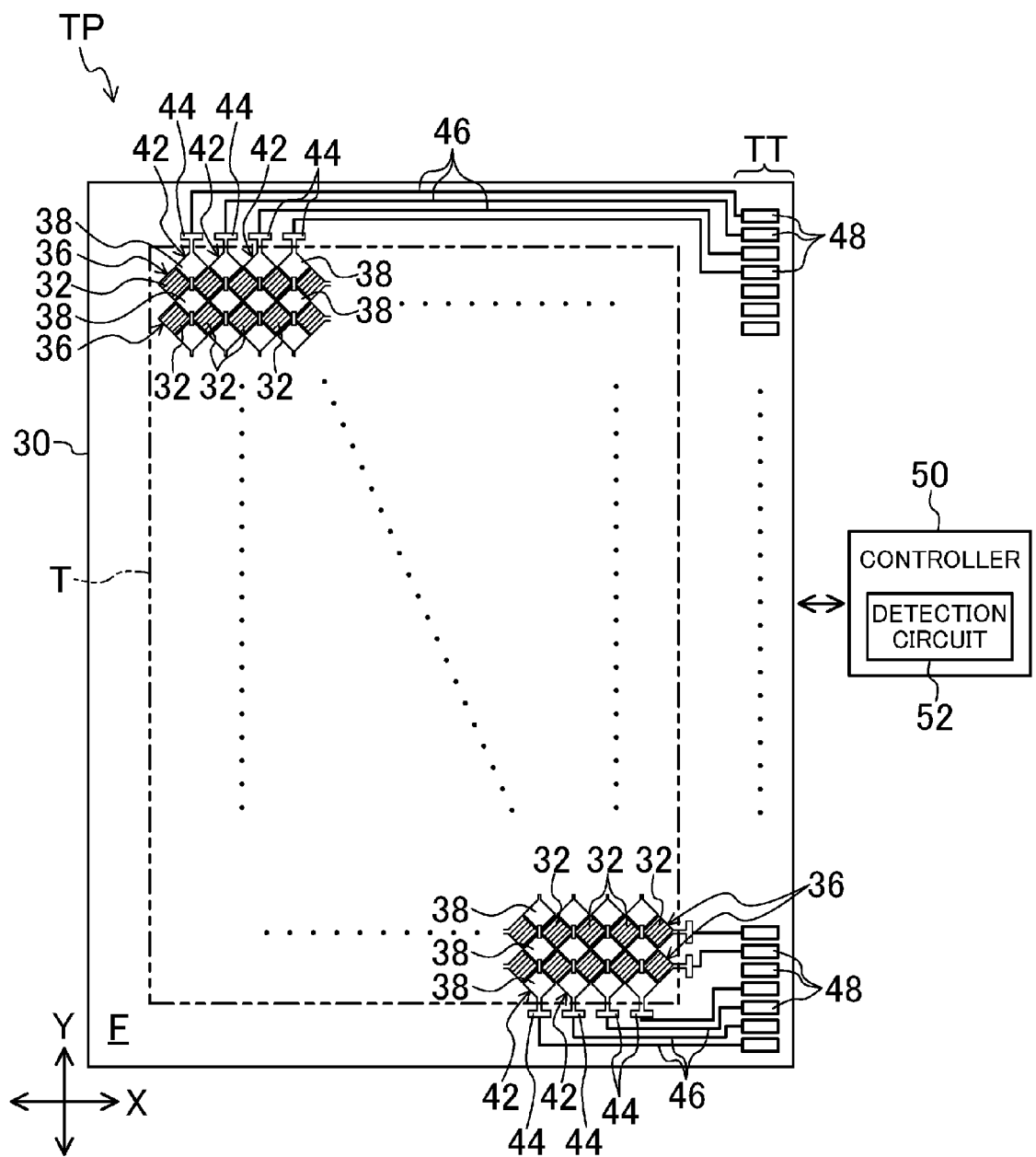
FIG. 10 is a plan view schematically showing a touch panel in Embodiment 2.
Figure 11:
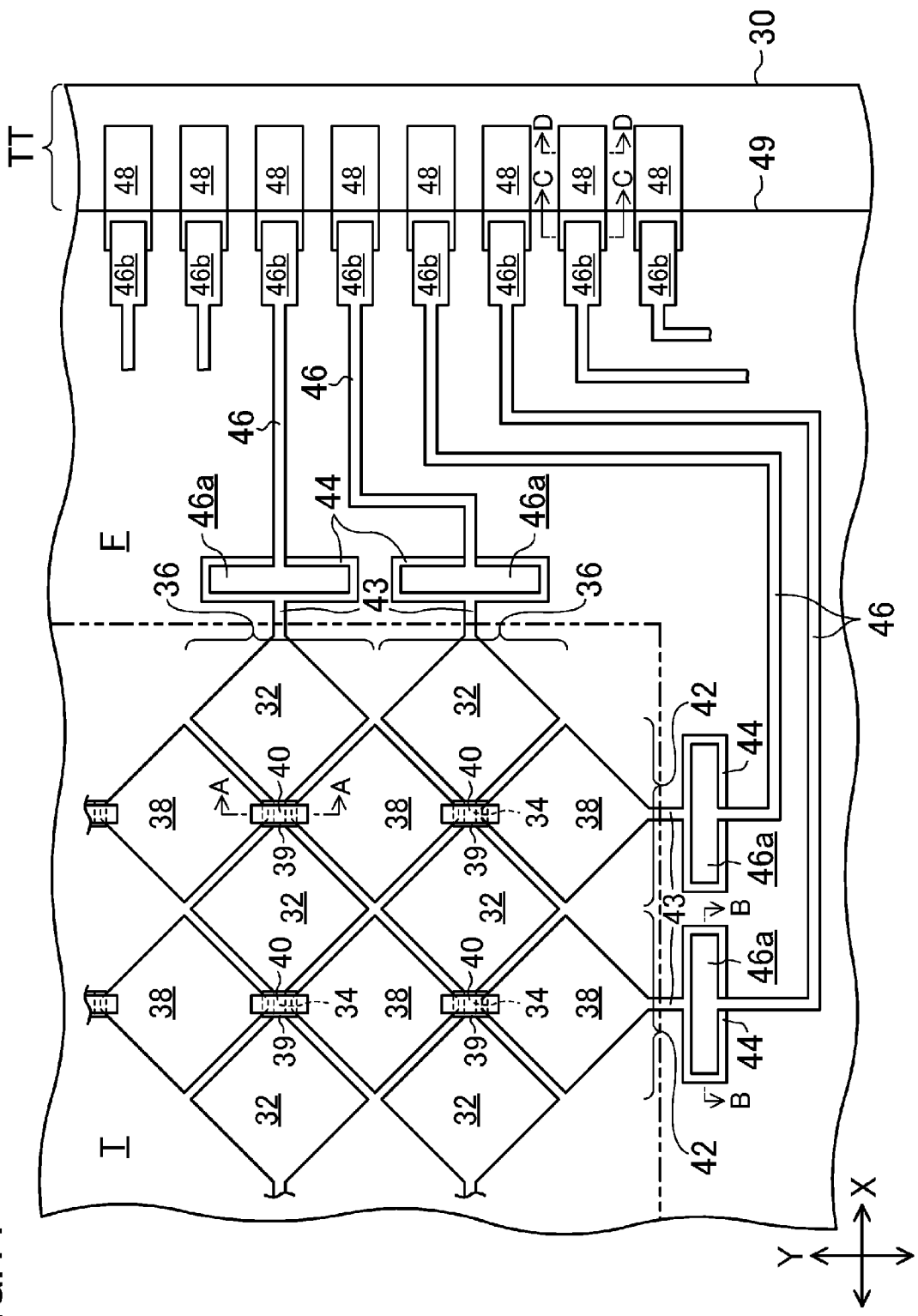
FIG. 11 is a plan view schematically showing a connection structure between touch detection electrodes and external connection terminals of the touch panel in Embodiment 2 in a partial enlarged view.
Figure 12:
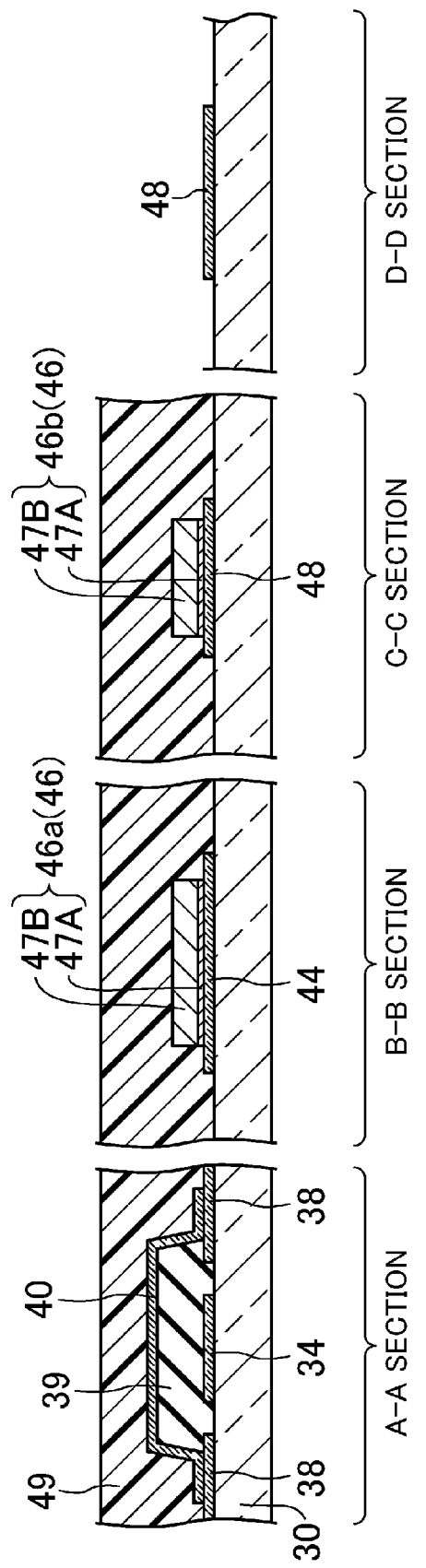
FIG. 12 includes cross-sectional views showing cross-sectional structures taken along lines A-A, B-B, C-C, and D-D in FIG. 11.

The configuration of the touch panel TP is shown in FIGS. 10 to 12. FIG. 10 is a schematic plan view of the touch panel TP. FIG. 11 is a plan view showing a connection structure of electrodes 32 and 38 for touch position detection and external connection terminals 48 of the touch panel TP in a partial enlarged view. FIG. 12 includes cross-sectional views showing cross-sectional structures taken along lines A-A, B-B, C-C, and D-D in FIG. 11.

The touch panel TP in this embodiment is formed directly on the surface of an insulating substrate 30 constituting a counter substrate 2 of the liquid crystal display panel DP, and this direct formation makes the touch panel TP-attached liquid crystal display device S2 thin as a whole. As shown in FIG. 10, the touch panel TP, which is a projected capacitive type touch panel, has: a touch region T in a rectangular shape, for example, that is a region for detecting the touch position contacted by a contact body (a finger of a user, etc.); a frame region F in a rectangular frame shape, for example, provided on the periphery of the touch region T; and a terminal region TT provided on one side (right side in FIG. 10) of the frame region F. The touch region T is placed in a region corresponding to the display region D of the liquid crystal display panel DP. The frame region F is placed in a region corresponding to the non-display region of the liquid crystal display panel DP.

The touch panel TP includes: touch detection electrodes 32 and 38 for touch position detection placed in the touch region T; a plurality of lead interconnects 46 electrically connected to the touch detection electrodes 32 and 38 and led out in the frame region F from the touch region T side to the terminal region TT side; external connection terminals 48 each provided at the lead destination of each of the lead interconnects 46; and a controller 50 that is an external circuit electrically connected to the external connection terminals 46.

The touch detection electrodes 32 and 38 are constituted by a plurality of first electrodes 32 (shaded electrodes in FIG. 10) arranged in a matrix and a plurality of second electrodes 38 (hollow electrodes in FIG. 10) arranged in a matrix. Such first and second electrodes 32 and 38 are arranged to line up alternately in an oblique direction, forming a honeycomb shape as a whole.

The first electrodes 32, formed in roughly a rectangular shape, are arranged at predetermined intervals so that the corners of each electrode face those of its adjacent electrodes in the side-to-side direction (X-axis direction) and the up-and-down direction (Y-axis direction) in FIG. 10. A plurality of first electrodes 32 lined in the X-axis direction constitute a first electrode group 36 where the adjacent first electrodes 32 are coupled to each other with first coupling sections 34 as shown in FIG. 11. In other words, the first electrodes 32 and the first coupling sections 34 are placed alternately in the X-axis direction, and a plurality of such first electrode groups 36 each constituted by a row of first electrodes 32 formed integrally via the first coupling sections 34 are arranged in the Y-axis direction in parallel with one another. The first electrodes 32 and the first coupling sections 34 are made of ITO or IZO that is a transparent conductive oxide.

The second electrodes 38, formed in roughly a rectangular shape, for example, are also arranged at predetermined intervals so that the corners of each electrode face those of its adjacent electrodes in the side-to-side direction and the up-and-down direction. A plurality of second electrodes 38 lined in the Y-axis direction constitute a second electrode group 42 where the adjacent second electrodes 38 are coupled and electrically connected to each other with second coupling sections 40. In other words, the second electrodes 38 and the second coupling sections 40 are placed alternately in the Y-axis direction, and a plurality of such second electrode groups 42 each constituted by a row of second electrodes 38 electrically connected via the second coupling sections 40 are arranged in the X-axis direction in parallel with one another. The second electrodes 38 and the second coupling section 40 are also made of ITO or IZO that is a transparent conductive oxide.

The first electrode groups 36 (first electrodes 32), the first coupling sections 34, and the second electrode groups 42 (second electrodes 38) are formed on the outer surface of the insulating substrate 30 constituting the counter substrate as shown in FIG. 12 (A-A section). Only the first coupling sections 34 are covered with island-shaped interlayer insulating films 39. The second coupling sections 40 extend on the interlayer insulting films 39 in a direction intersecting with the first coupling sections 34, each constituting a bridge structure striding over the corresponding first coupling section 34 via the interlayer insulating film 39, with both ends thereof being connected to corners of its adjacent second electrodes 38.

As described above, in this embodiment, since the first electrode groups 36 and the second electrode groups 42 are provided in the same layer, a same degree of change can be allowed to occur in the capacitances formed between the first and second electrodes 32 and 38 and a contact body such as a finger at the touch position. This can reduce the difference in the sensitivity toward a change in capacitance between the first electrodes 32 and the second electrodes 38, permitting sensitive detection of the touch position.

On one side of each of the first electrode groups 36 and the second electrode groups 42, an interconnect 43 is led out from the first electrode 32 or the second electrode 38 as shown in FIG. 11, and an internal connection terminal 44 is formed at the tip end thereof. In this embodiment, the first electrode groups 36, the second electrode groups 42, the interconnects 43, and the internal connection terminals 44 constitute the transparent electrodes according to the present disclosure.

The first electrode groups 36 (first electrodes 32), the second electrode groups 42 (second electrodes 38), the second coupling sections 40, and the interlayer insulating films 39 are covered with a protection insulting film 49 as shown in FIG. 12 (A-A section). The protection insulating film 49, made of an acrylic-base organic insulating material, etc., is not formed above the terminal region TT, exposing the external connection terminals 48 to outside, as shown in FIG. 11.

The external connection terminals 48 are arranged in a row along an edge of the insulating substrate 30 constituting the counter substrate 2 with a predetermined spacing therebetween. Such external connection terminals 48, made of ITO or IZO that is a transparent conductive oxide, are formed from the same film as that forming the first electrodes 32 and the second electrodes 38. Thus, since the external connection terminals 48 exposed outside the protection insulating film 49 are made of ITO or IZO as described above, they are high in corrosion resistance, being resistant to corrode in the atmosphere. Therefore, in the connection with an external circuit, it is possible to avoid such an event that, due to corrosion of the connection terminals 48, the resistance of the terminals may become high causing connection failure.

The lead interconnects 46 extend alongside one another from near the touch region T up to immediately before the terminal region TT. The lead interconnects 46 are covered with the protection insulating film 49 with the entire thereof being located inside the edges of the insulating film 49. With this protection insulating film 49, moisture, etc. are blocked from entering from outside, and thus the lead interconnects 46 can be well prevented from corrosion.

Each of the lead interconnects 46 is connected to the corresponding internal connection terminal 44 with its lead base end 46a lying on the internal connection terminal 44, and connected to the corresponding external connection terminal 48 with its lead tip end 46b lying on the external connection terminal 48. Like the lead interconnects 14 of the drive substrate 5 and the common substrate 6 in Embodiment 1, the lead interconnects 46 are each constituted by a barrier metal layer 47A made of titanium nitride (TiN) having a nitrogen concentration between 35 atoms/cm$^2$ and 65 atoms/cm$^2$ inclusive (preferably, between 40 atoms/cm$^2$ and 50 atoms/cm$^2$ inclusive) and a low-resistance metal layer 47B made of titanium (Ti) as shown in FIG. 12 (B-B section and C-C section). Therefore, a similar action to that in the drive substrate 5 in Embodiment 1 is exerted between the lead interconnects 46 and the internal and external connection terminals 44 and 48, preventing peeling off of the lead interconnects 46 from the connection terminals 44 and 48.

Note that, although the barrier metal layer 47A has been described as being made of titanium nitride (TiN) in this embodiment, it may be formed of molybdenum nitride (MoN), tantalum nitride (TaN), tungsten nitride (WN), or chromium nitride (CrN), or formed of any of other high-melting metals, in place of TiN. Also, the low-resistance metal layer 47B is not limited to titanium (Ti), but, instead of this, may be formed of molybdenum (Mo), tantalum (Ta), tungsten (W), or chromium (Cr), or any of other high-melting metals.

<Configuration of Controller 50>

The controller 50 is mounted to the terminal region TT as a drive integrated circuit called a tape automated bonding (TAB) circuit. The controller 50 includes, as a detection circuit 52, a capacitance detection circuit that detects a change in capacitance occurring between the first and second electrodes 32 and 38 located at the touch position and a contact body when the touch region T is touched by the contact body, or an impedance detection circuit that detects a change in impedance occurring in each of the first electrode 32 and the second electrode 38 located at the touch position when the touch region T is touched. The controller 50 is configured to detect the touch position of the contact body in the touch region T, and the move of the touch position, by comparing signals detected by the detection circuit 52 via the lead interconnects 46.

—Fabrication Method—

Next, a fabrication method for the touch panel TP-attached liquid crystal display device S2 will be described by way of example. The fabrication method for the touch panel TP-attached liquid crystal display device S2 includes a touch panel fabrication process, a liquid crystal display panel fabrication process, a backlight unit fabrication process, and a modularizing process. Note that, since the liquid crystal display panel fabrication process and the backlight unit fabrication process are similar to those in Embodiment 1, detailed description of these processes is omitted here.

<Touch Panel Fabrication Process>

The touch panel fabrication process is shown in FIGS. 13 and 14. FIG. 13 is a process chart showing former-half steps of the touch panel fabrication process, and FIG. 14 is a process chart showing latter-half steps of the touch panel fabrication process. Note that FIGS. 13 and 14 show cross sections of the portions corresponding to those in FIG. 12.

Figure 13A:
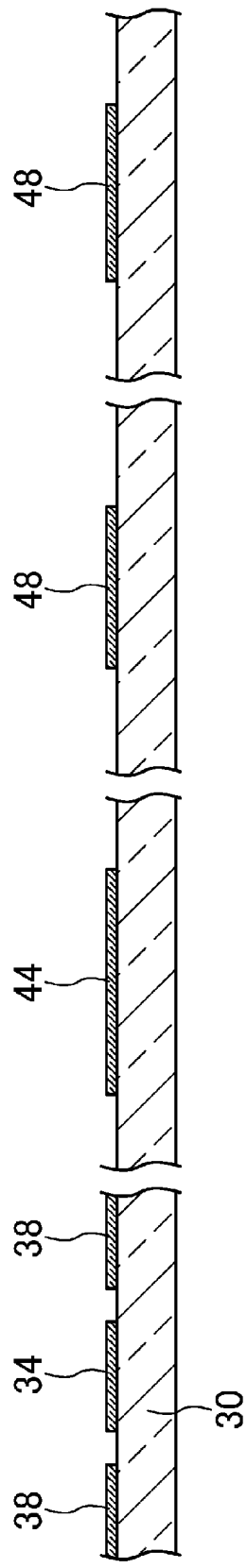
FIG. 13 is a process chart showing former-half steps in a fabrication method for the touch panel in Embodiment 2, which includes cross-sectional views of portions corresponding to those in FIG. 12.

First, a transparent conductive film made of ITO or IZO having the cubic bixbyite type structure is formed on the previously-prepared insulating substrate 30 such as a glass substrate by sputtering. The transparent conductive film is then patterned by photolithography to form the first electrode groups 36 (first electrodes 32), the first coupling sections 34, the second electrode groups 42 (second electrodes 38), and the external connection terminals 48 as shown in FIG. 13(a).

Figure 13B:
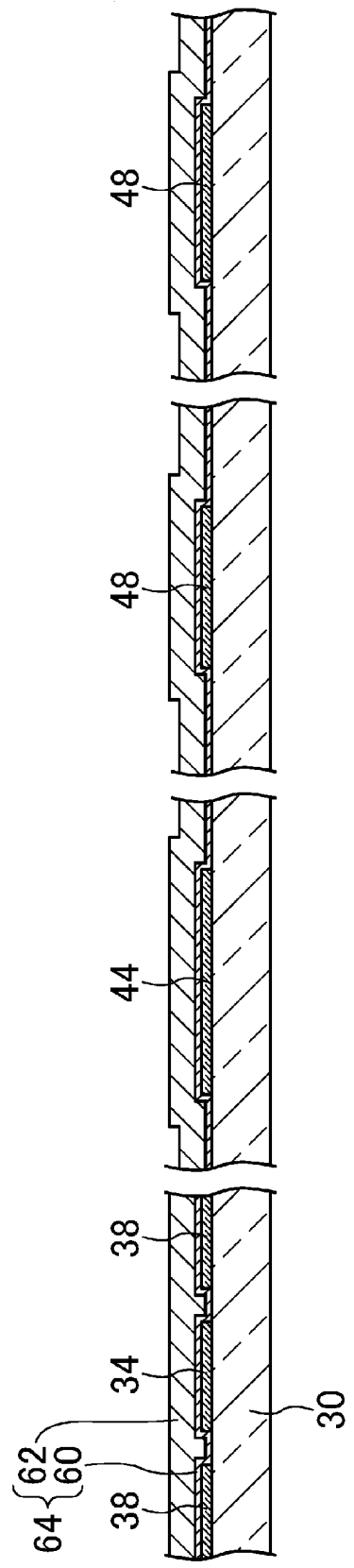
Figure 13C:
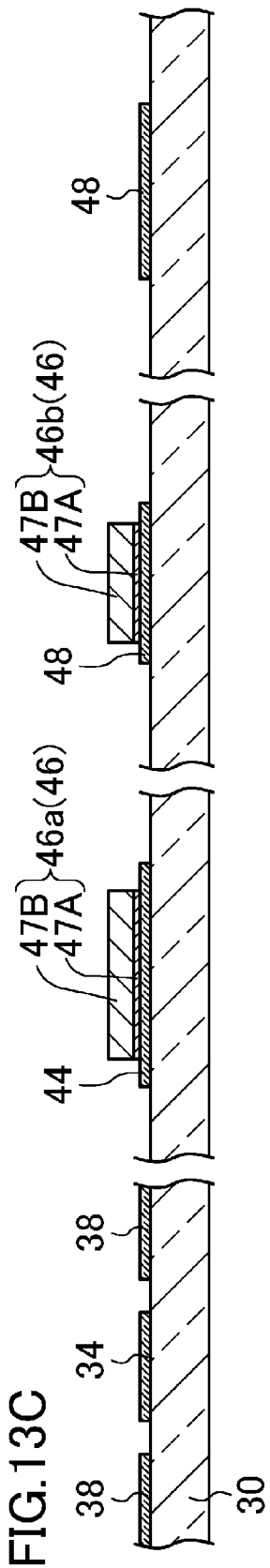

Thereafter, as shown in FIG. 13(b), a titanium nitride (TiN) film 60 having a cubic sodium chloride (NaCl)-type structure and a titanium (Ti) film 62 having a hexagonal crystal structure are formed sequentially on the substrate having the first electrode groups 36 (first electrodes 32), the first coupling sections 34, the second electrode groups 42 (second electrodes 38), and the external connection terminals 48 formed thereon by sputtering, to form a metal multilayer film 64 of these films. The metal multilayer film 64 is then patterned by photolithography to form the lead interconnects 46 as shown in FIG. 13(c).

Figure 14A:
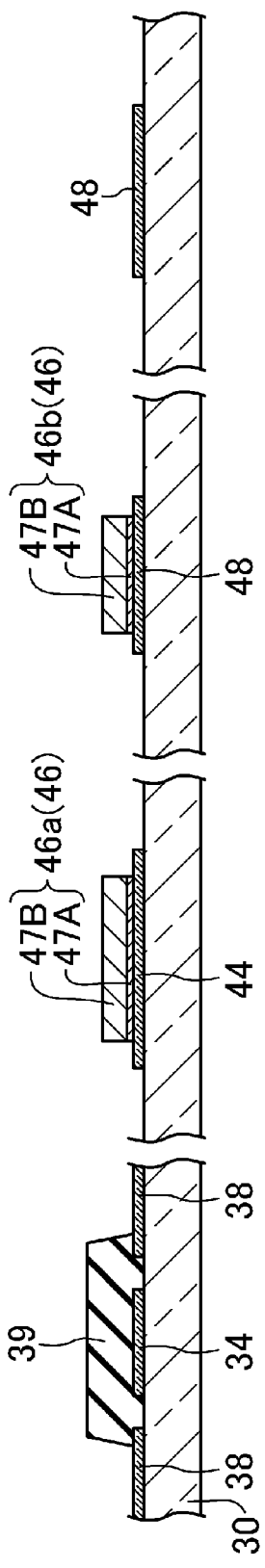
FIG. 14 is a process chart showing latter-half steps in the fabrication method for the touch panel in Embodiment 2, which includes cross-sectional views of portions corresponding to those in FIG. 12.

Subsequently, an insulating film made of silicon nitride (SiN), for example, is formed on the substrate having the lead interconnects 46 formed thereon by chemical vapor deposition (CVD) so as to cover the first electrode groups 36 (first electrodes 32), the first coupling sections 34, the second electrode groups 42 (second electrodes 38), the external connection terminals 48, and the lead interconnects 46. The insulating film is then patterned by photolithography to form the interlayer insulating films 39 as shown in FIG. 14(a).

Figure 14B:
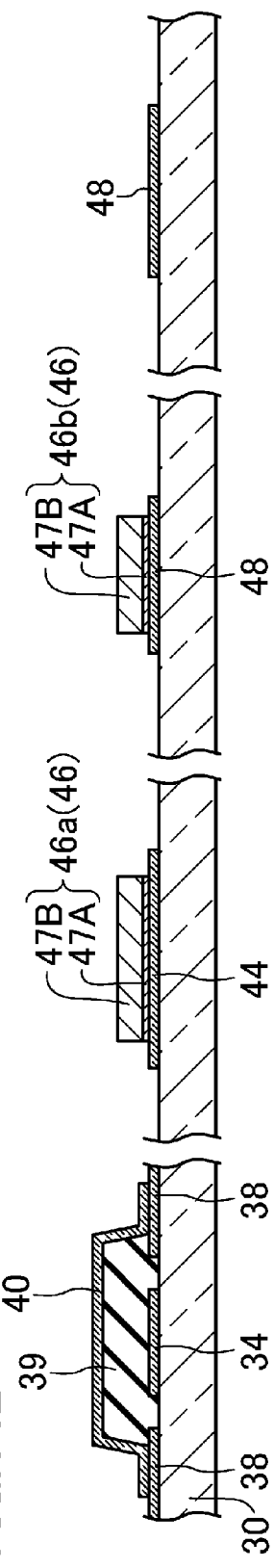

Then, a transparent conductive film made of ITO or IZO is formed on the substrate having the interlayer insulating films 39 formed thereon by sputtering. The transparent conductive film is then patterned by photolithography to form the second coupling sections 40 as shown in FIG. 14(b).

Figure 14C:
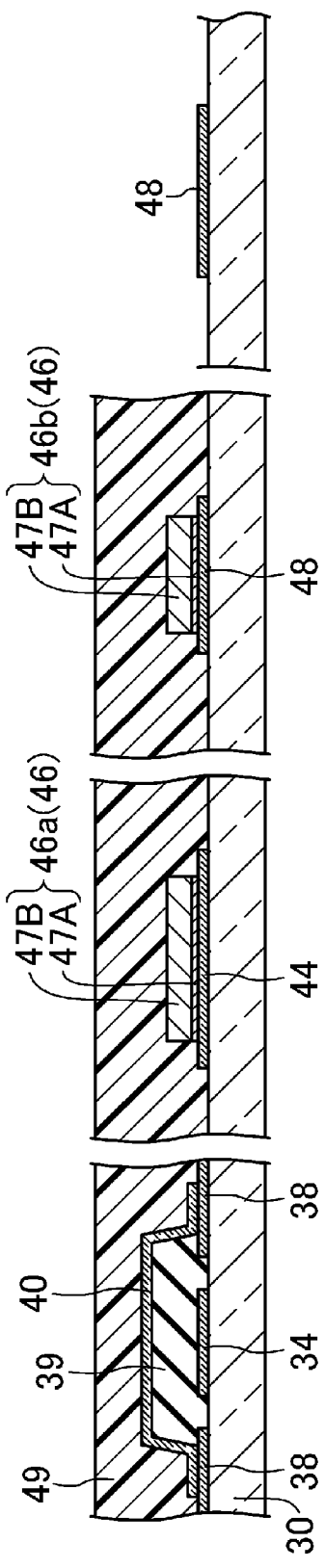

Thereafter, an insulating film made of an acrylic-base organic insulating material, for example, is formed on the substrate having the second coupling sections 40 formed thereon by spin coating or slit coating. The insulating film is then patterned by photolithography to remove the portion of the insulating film located in the terminal region TT, exposing the external connection terminals 48 therefrom, to form the protection insulation film 49 as shown in FIG. 14(c).

The touch panel TP can be fabricated in the manner described above. Thereafter, the resultant touch panel-attached substrate 30 is fed to a counter substrate fabrication process. In the liquid crystal display panel fabrication process, process steps similar to those in Embodiment 1 are followed except that a black matrix, color filters, etc. are formed on the back-face side of the substrate 30 to fabricate the touch panel TP-attached counter substrate 2.

<Modularizing Process>

An interconnect substrate such as a FPC board is mounted to the terminal region of the liquid crystal display panel DP via an anisotropic conductive film. Also, the controller 50 is mounted to the terminal region TT of the touch panel TP. Thereafter, the backlight unit BL is mounted on the back-face side of the touch panel TP-attached liquid crystal display panel DP. In this way, the touch panel TP-attached liquid crystal display panel DP and the backlight unit BL are modularized.

By performing the above-described processes, the touch panel TP-attached liquid crystal display device S2 shown in FIG. 9 can be fabricated.

—Advantage of Embodiment 2—

In Embodiment 2, the barrier metal layer 47A constituting each of the contact portions of the lead interconnect 46 with the internal connection terminal 44 and the external connection terminal 48 is formed of titanium nitride (TiN), and the nitride concentration thereof is between 35 atoms/cm$^2$ and 65 atoms/cm$^2$ inclusive. Therefore, the lead interconnect 46 is prevented from peeling off from the connection terminals 44 and 48, ensuring the connection of the lead interconnect 46 with the connection terminals 44 and 48 and thus permitting normal operation of the touch panel TP without causing defects. Accordingly, in the touch panel TP and the liquid crystal display device S2 having the same, the problems of reduction in yield and increase in fabrication cost can be improved, and thus cost reduction can be achieved.

<<Alteration of Embodiment 2>>

Figure 15:
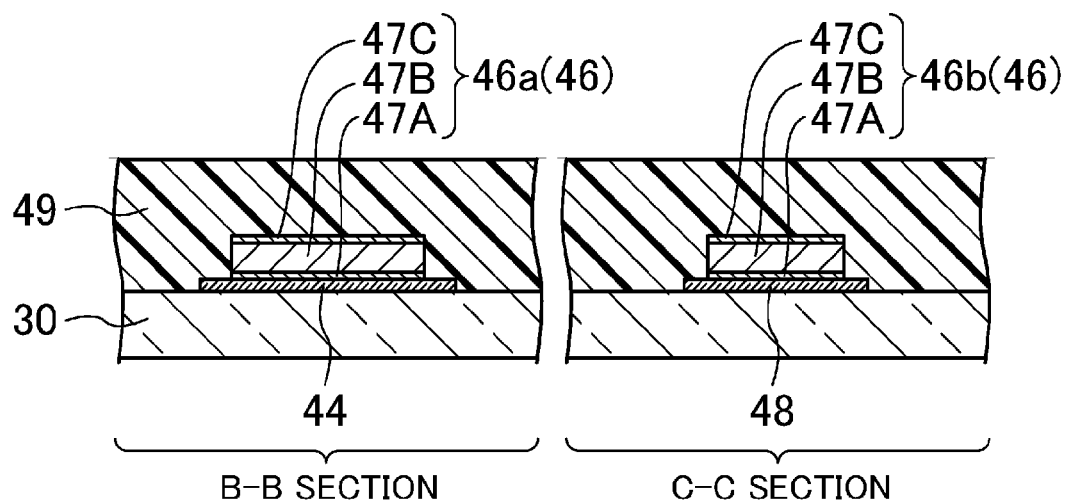
FIG. 15 includes cross-sectional views of portions corresponding to the sections taken along lines B-B and C-C in FIG. 12, showing the structure of lead interconnects in an alteration of Embodiment 2.

FIG. 15 includes cross-sectional views showing the structure of the lead interconnect 46 in an alteration of Embodiment 2, showing portions corresponding to the cross sections taken along lines B-B and C-C in FIG. 12.

While the lead interconnect 46 has been described to have a two-layer structure (Ti/TiN) of the barrier metal layer 47A made of titanium nitride (TiN) and the low-resistance metal layer 47B made of titanium (Ti) stacked sequentially in Embodiment 1, the lead interconnect 46 in this alteration has a three-layer structure (TiN/Ti/TiN) of the barrier metal layer 47A made of titanium nitride (TiN), the low-resistance metal layer 47B made of titanium (Ti), and a metal nitride layer 47C made of titanium nitride (TiN) stacked sequentially.

The touch panel TP having the lead interconnects 46 having such a multilayer structure can be fabricated in the following manner: a titanium nitride (TiN) film is further formed, subsequent to the formation of the titanium nitride (TiN) film 60 and the titanium (Ti) film 62, by sputtering on the substrate on which the first electrode groups 36 (first electrodes 32), the first coupling sections 34, the second electrode groups 42 (second electrodes 38), and the external connection terminals 48 have been formed, forming the metal multilayer film having the three-layer structure, and the metal multilayer film is patterned by photolithography, to form the lead interconnects 46.

<<Other Embodiments>>

In Embodiments 1 and 2 and their alterations described above, the following configurations and fabrication methods may be used.

<Placement of First Electrode 32, First Coupling Section 34, Second Electrode 38, Second Coupling Section 40>

Figure 16:
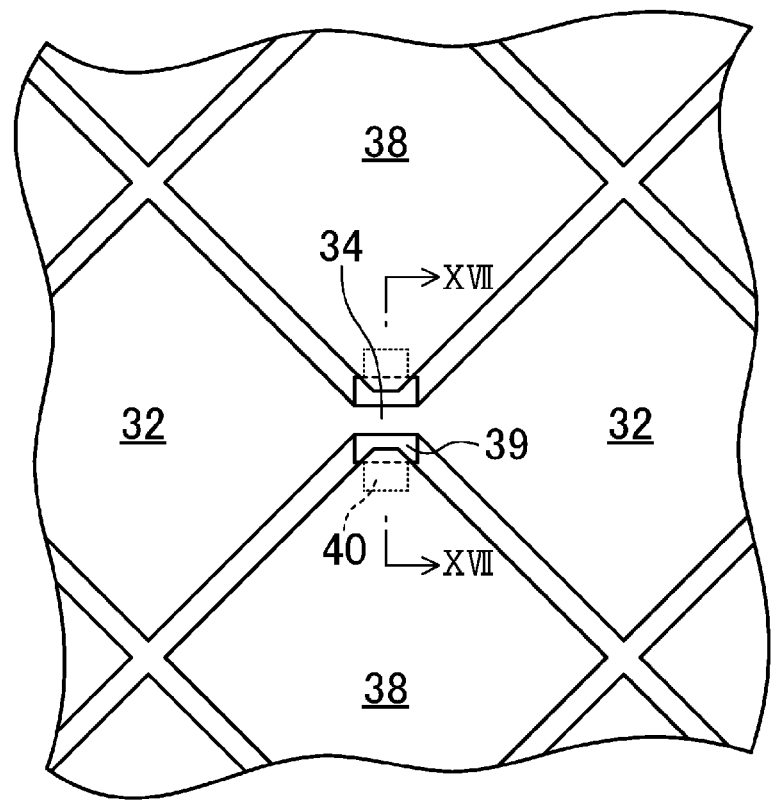
FIG. 16 is a plan view showing a touch region of a touch panel in another embodiment in a partial enlarged view.
Figure 17:
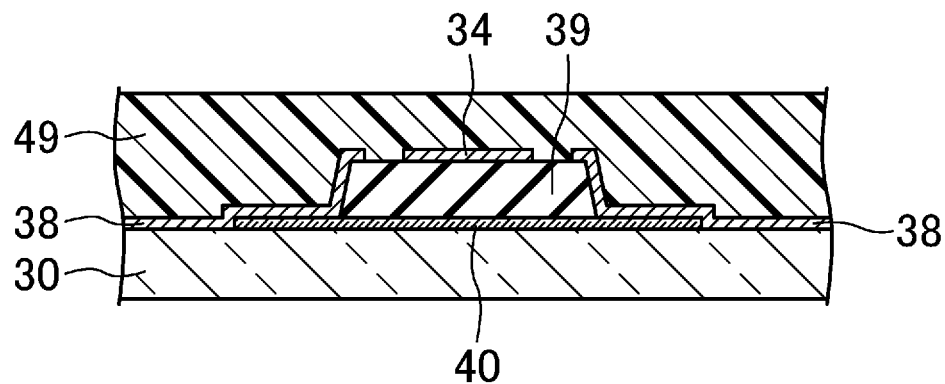
FIG. 17 is a cross-sectional view showing a cross-sectional structure taken along line XVII-XVII in FIG. 16.

FIG. 16 is a schematic plan view showing the touch region T of the touch panel TP in another embodiment in a partial enlarged view. FIG. 17 is a cross-sectional view showing a cross-sectional structure taken along line XVII-XVII in FIG. 16.

In Embodiment 2 above, described has been the configuration where the first electrodes 32, the first coupling sections 34, and the second electrodes 38 are formed on the surface of the substrate 30, with only the first coupling sections 34 being covered with the interlayer insulating films 39, and the second coupling sections 40 stride over the corresponding first coupling sections 34 via the interlayer insulating films 39. However, the present disclosure is not limited to this.

For example, as shown in FIGS. 16 and 17, the first electrodes 32, the second electrodes 38, and the second coupling sections 40 may be formed on the surface of the substrate 30, with corners of any adjacent second electrodes 38 lying on the in-between second coupling section 40 and being connected thereto. Only the center portion of the second coupling section 40 may be covered with the interlayer insulating film 39, and the first coupling section 34 may stride over the second coupling section 40 via the interlayer insulating film 39. Otherwise, the interlayer insulating film 39 may be formed over the entire area of the touch region T, and the first electrode groups 36 (first electrodes 32) and the second electrode groups 42 (second electrodes 38) may be placed on the interlayer insulating film 39.

<Configuration of 2D/3D Switchable Liquid Crystal Display Device>

Figure 18:
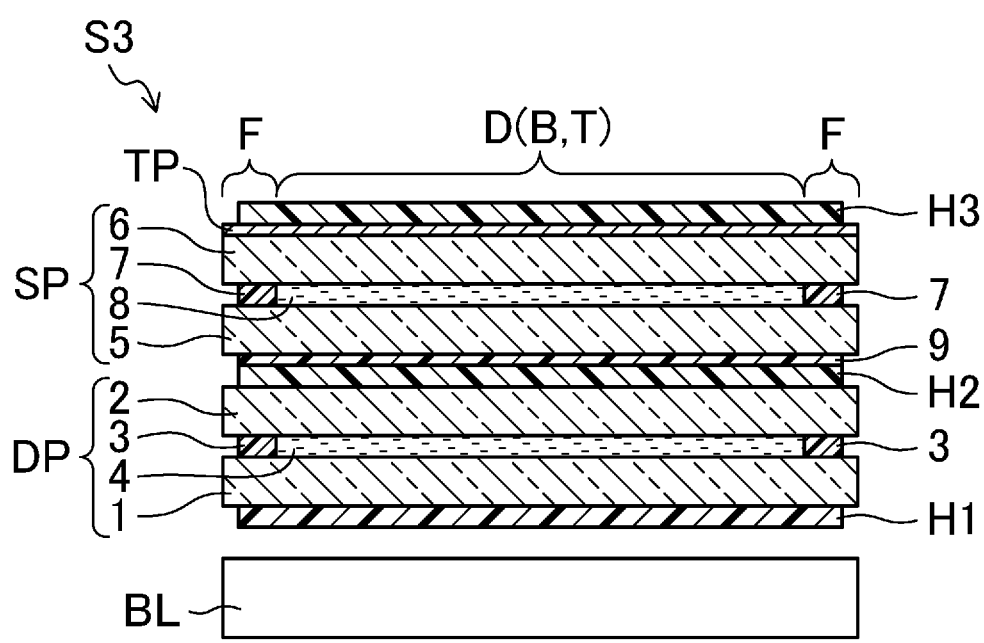
FIG. 18 is a cross-sectional view schematically showing the cross-sectional structure of a touch panel-equipped 2D/3D switchable liquid crystal display device in another embodiment.

FIG. 18 is a cross-sectional view schematically showing a cross-sectional structure of a 2D/3D switchable liquid crystal display device S3 in another embodiment.

While the 2D/3D switchable liquid crystal display device S1 having no touch panel TP has been described in Embodiment 1, the present disclosure is not limited to this. As shown in FIG. 18, the 2D/3D switchable liquid crystal display device S3 may have a touch panel TP. In this case, also, from the standpoint of thinning the liquid crystal display device S3 as a whole, it is preferable to form the touch panel TP directly on a surface of a substrate (e.g., the common substrate 6) constituting the switching liquid crystal panel SP.

In such a touch panel TP-attached 2D/3D switchable liquid crystal display device S3, it is preferable to configure the drive substrate 5 and the common substrate 6 as in Embodiment 1 described above, and configure the touch panel TP as in Embodiment 2 described above. By being configured as described above, the drive substrate 5, the common substrate 6, and the touch panel TP can be operated normally with the lead interconnects 14, 24, and 46 being reliably connected to the internal connection terminals 12b, 22b, and 44 and the external connection terminals 16, 26, and 48, respectively. Thus, as the touch panel TP-attached 2D/3D switchable liquid crystal display device S3, the problems of reduction in yield and increase in fabrication cost can be widely improved.

Also, in the touch panel TP-attached 2D/3D switchable liquid crystal display device S3, only at least one of the drive substrate 5 and the common substrate 6 may have a configuration similar to that in Embodiment 1, and only the touch panel TP may have a configuration similar to that in Embodiment 2. Such a configuration, also, contributes to improving the problems of reduction in yield and increase in fabrication cost in the touch panel TP-attached 2D/3D switchable liquid crystal display device S3.

While the 2D/3D switchable liquid crystal display device 51 having the switching liquid crystal panel SP placed on the front-face side of the liquid crystal display panel DP has been described in Embodiment 1, the present disclosure is not limited to this. For example, a 2D/3D switchable liquid crystal display device having the switching liquid crystal panel SP placed on the back-face side of the liquid crystal display panel DP may be provided.

Otherwise, while the 2D/3D switchable liquid crystal display device 51 has been described in Embodiment 1, the present disclosure is not limited to this. The images divided to have different viewing angles in the second display state do not necessarily require mutual relations as in the case of the right-eye image and the left-eye image.

For example, considered is a use of Embodiment 1 for a display device that displays an image from a car navigation system for a driver on the driver seat of an automobile and yet displays a television image for a fellow passenger on the passenger seat. When different images are displayed for a plurality of observers, the pattern of arrangement of light-shielding portions and light-transmitting portions of a parallax barrier, i.e., the pattern of arrangement of the drive switch electrodes 12 and the common switch electrodes 22, should be set appropriately so that the image on the liquid crystal display panel DP visually recognized via the parallax barrier can be separated as images to be observed by the plurality of observers at positions a predetermined distance apart from each other.

The added function devices such as the switching liquid crystal panel DP and the touch panel TP can be applied, not only to the liquid crystal display devices S1, S2, and S3, but also to other various display devices such as an organic electroluminescence (EL) display device, an inorganic EL display device, a plasma display device, and a field emission display (FED) device.

<Configuration of Touch Panel TP>

While the projected capacitive touch panel TP has been described as an example in Embodiment 2, the present disclosure is not limited to this. For example, a surface capacitive touch panel may be used, which includes: a transparent electrode for position detection provided on the entire surface of the touch region; a linearization electrode formed of a plurality of segments provided on the peripheral portion of the transparent electrode for securing uniform field distribution in the touch region; a plurality of (e.g., four) lead interconnects each of which is connected to each of terminal portions provided at the four corners of the linearization electrode with one end thereof lying on the terminal portion and is led out to a substrate edge at the other end; and a current detection circuit that applies a fixed A/C voltage to the terminal portions via the lead interconnects and also detects the current flowing through the terminal portions, where an impedance between each terminal portion and the ground point changing with the touch position is detected to detect the touch position and the move of the position. Embodiment 2 can also be applied to various types of touch panels as far as they have a transparent electrode made of a transparent conductive oxide and a lead interconnect connected to the transparent electrode with part thereof lying on the transparent electrode.

While the preferred embodiments and alterations of the present disclosure have been described, the technical range of the present disclosure is not limited to the range defined by these embodiments and alterations. It will be understood by those skilled in the art that the above-described embodiments and alterations are mere illustrative, other various alterations are possible by combining the components and work processes of these embodiments and alterations, and such alterations also fall within the scope of the present disclosure.

INDUSTRIAL APPLICABILITY

As described above, the present disclosure is useful for electrode substrates, as well as display devices and touch panels having the same, and in particular suitable to electrode substrates, as well as display devices and touch panels having the same, that are required to prevent lead interconnects from peeling off from transparent electrodes to ensure the connection between the lead interconnects and the transparent electrodes and thus permit normal operation of the electrode substrates.

DESCRIPTION OF REFERENCE CHARACTERS

DP Liquid Crystal Display Panel
S1, S2, S3 Liquid Crystal Display Device
SP Switching Liquid Crystal Panel
TP Touch Panel (Electrode Substrate)
T Touch Region
TT Terminal Region
5 Drive Substrate (Electrode Substrate)
6 Common Substrate (Electrode Substrate)
10, 20, 30 Insulating Substrate (Base Substrate)
12 Drive Switch Electrode (Transparent Electrode)
12a, 22a, 42 Interconnect
12b, 22b, 44 Internal Connection Terminal
14, 24, 46 Lead interconnect
15A, 47A Barrier Metal Layer
15B, 47B Low-Resistance Metal Layer
16, 26, 48 External Connection Terminal
22 Common Switch Electrode (Transparent Electrode)
32 First Electrode (Transparent Electrode)
38 Second Electrode (Transparent Electrode)
50 Controller

The invention claimed is:

1. A display device, comprising:
a display panel that displays an image corresponding to input image data; and
a parallax barrier that presents different viewing angles for a first display region and a second display region in the image, wherein
the parallax barrier includes a polarizing plate and a switching liquid crystal panel, the switching liquid crystal panel switches to turn on and turn off the parallax barrier,
the switching liquid crystal panel includes an electrode substrate,
the electrode substrate includes:
a first base substrate;
a first transparent electrode including a transparent conductive oxide on the first base substrate; and
a first lead interconnect that is connected to the first transparent electrode with one end thereof lying on the first transparent electrode and is led out to an outer edge of the first base substrate at the other end thereof,
a first contact portion of the first lead interconnect with the first transparent electrode includes a high-melting metal nitride with a nitride concentration between 35 atoms/cm$^2$ and 65 atoms/cm$^2$ inclusive, and
the high-melting metal nitride is titanium nitride, molybdenum nitride, tantalum nitride, tungsten nitride, or chromium nitride.

2. The display device claim 1, further comprising:
an insulating film covering the first lead interconnect; and
a connection terminal including a transparent conductive oxide to which the first lead interconnect is connected with a lead tip end thereof lying on the connection terminal and that is located outside the insulating film, wherein
a second contact portion of the first lead interconnect with the connection terminal includes a high-melting metal nitride with a nitride concentration between 35 atoms/cm$^2$ and 65 atoms/cm$^2$ inclusive.

3. The display device of claim 1, wherein the first lead interconnect is comprised of a barrier metal layer including a high-melting metal nitride constituting the contact portion with the transparent first electrode and a low-resistance metal layer including a metal lower in resistance than the barrier metal layer stacked sequentially.

4. The display device of claim 1, wherein the transparent conductive oxide is an indium tin oxide or an indium zinc oxide.

5. The display device of claim 1, further comprising:
a touch panel comprising:
   a second base substrate;
   a second transparent electrode including a transparent conductive oxide on the second base substrate; and
   a second lead interconnect connected to the second transparent electrode with one end thereof lying on the first transparent electrode and is led out to an outer edge of the second base substrate at the other end thereof, wherein
the touch panel has a touch region including the second transparent electrode a touch position that detects contact by a contact body, and a terminal region outside the touch region to connect to an external circuit,
the second lead interconnect is led out from a touch region side to a terminal region side, and electrically connected, via the terminal region, to a controller for detecting a contact position of the contact body when the contact body contacts the touch position,
a third contact position of the second lead interconnect with the second transparent electrode includes titanium nitride, molybdenum nitride, tantalum nitride, tungsten nitride, and chromium nitride, and
a nitride concentration of the third contact portion between 35 atoms/cm$^2$ and 65 atoms/cm$^2$ inclusive.

* * * * *